United States Patent
Tompkins et al.

(10) Patent No.: US 11,169,607 B1
(45) Date of Patent: Nov. 9, 2021

(54) HAPTIC-FEEDBACK APPARATUSES THAT UTILIZE LINEAR MOTION FOR CREATING HAPTIC CUES

(71) Applicant: Facebook Technologies, LLC, Menlo Park, CA (US)

(72) Inventors: Glen Jason Tompkins, Woodinville, WA (US); Bradley Morris Johnson, Edmonds, WA (US); Boyd Drew Allin, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 64 days.

(21) Appl. No.: 15/931,383

(22) Filed: May 13, 2020

Related U.S. Application Data

(60) Provisional application No. 62/935,008, filed on Nov. 13, 2019.

(51) Int. Cl.
  *G06F 3/01* (2006.01)
  *G08B 6/00* (2006.01)
  *G01D 5/14* (2006.01)

(52) U.S. Cl.
  CPC ............ *G06F 3/016* (2013.01); *G01D 5/145* (2013.01); *G06F 3/011* (2013.01); *G08B 6/00* (2013.01)

(58) Field of Classification Search
  CPC ......... G06F 3/016; G06F 3/011; G01D 5/145; G08B 6/00
  See application file for complete search history.

(56) References Cited

U.S. PATENT DOCUMENTS

2017/0185188 A1* 6/2017 Yairi ..................... G06F 3/016
2019/0094976 A1* 3/2019 Szeto ..................... H01F 7/064

* cited by examiner

*Primary Examiner* — Daryl C Pope
(74) *Attorney, Agent, or Firm* — Morgan, Lewis & Bockius LLP

(57) ABSTRACT

An apparatus for creating haptic simulations is provided. The apparatus includes a body that defines an inner cavity, and a pair of connectors positioned adjacent to ends of the body. A wire electrically connects the connectors and is wound around a first portion of the body in a first direction and wound around a second portion of the body in an opposite direction. A ring magnet is secured to an outer surface of the body. An armature magnet is slidably positioned within the inner cavity aligned with the ring magnet due to its magnetic pull. When a current is driven through the wire, simultaneous push and pull forces are created, causing the armature magnet to oscillate within the inner cavity to create vibration. When a magnitude of the current driven exceeds a threshold, the armature magnet impacts a stop of the inner cavity to create a "click" stimulation.

20 Claims, 20 Drawing Sheets

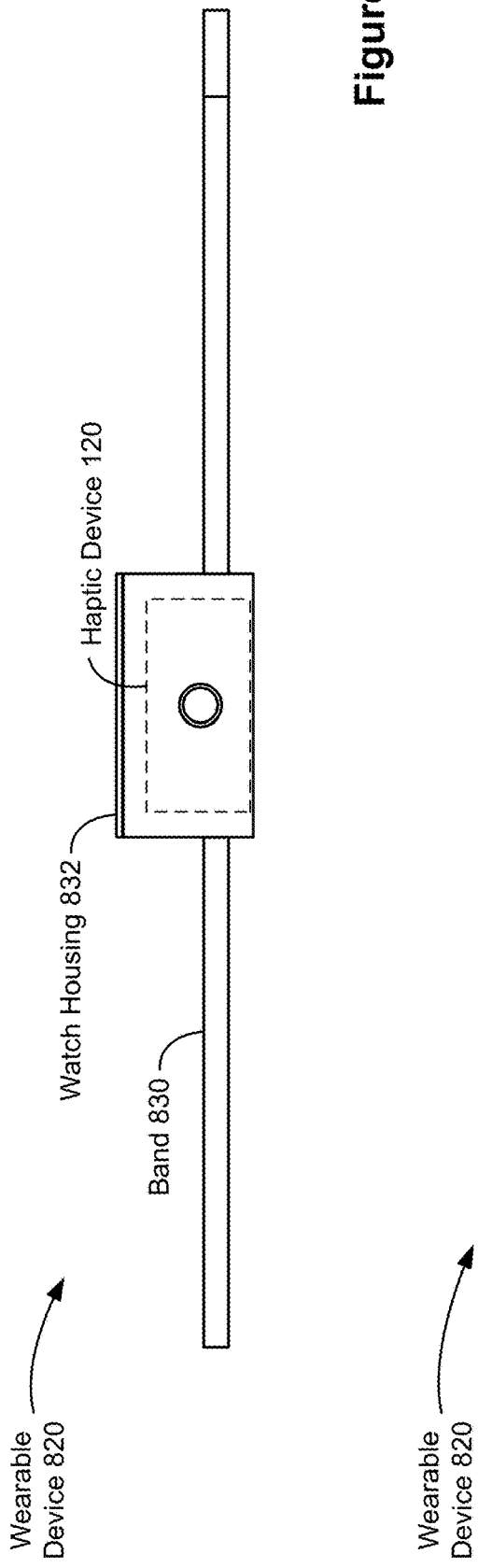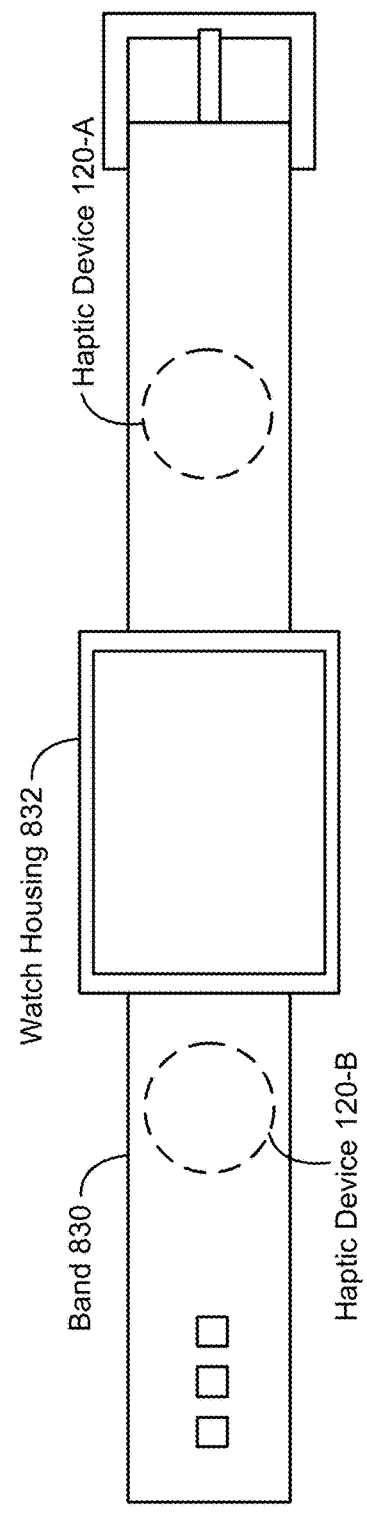

HAPTIC-FEEDBACK APPARATUSES THAT UTILIZE LINEAR MOTION FOR CREATING HAPTIC CUES

RELATED APPLICATIONS

This application claims priority to U.S. Provisional Patent Application No. 62/935,008 filed on Nov. 13, 2019, entitled "Haptic-Feedback Apparatuses that Utilize Linear Motion for Creating Haptic Cues," which is incorporated herein by reference in its entirety.

This application is related to U.S. Non-provisional application Ser. No. 14/737,185, filed Jun. 11, 2015, entitled "Hand-Held Controller with Pressure-Sensing Switch for Virtual-Reality Systems," now U.S. Pat. No. 9,870,052, which is incorporated by reference in its entirety.

This application is also related to U.S. Non-provisional application Ser. No. 16/244,018, filed Jan. 9, 2019, entitled "Haptic Device for Creating Vibration-, Pressure-, and Shear-based Haptic Cues," which is incorporated by reference in its entirety.

This application is also related to U.S. Non-provisional application Ser. No. 16/058,947, filed Aug. 8, 2018, entitled "Pneumatically Controlled Haptic Mechanisms for Haptic Feedback," which is incorporated by reference in its entirety.

TECHNICAL FIELD

This application relates generally to haptic stimulation, including but not limited to, creating haptic stimulations on users of virtual and/or augmented reality devices.

BACKGROUND

Artificial-Reality devices, including virtual-reality and augmented-reality devices, have wide applications in various fields, including engineering design, medical surgery practice, military simulated practice, and video gaming. Haptic or kinesthetic stimulations recreate the sense of touch by applying forces, vibrations, or motions to a user, and are frequently implemented with virtual and augmented reality devices. In certain applications, haptic stimulations are desired at locations where dexterity and motion of the user cannot be impeded. Conventional haptic devices that are to be worn, however, are cumbersome and therefore impede dexterity and motion of the user. Furthermore, conventional haptic devices are typically limited to one type of haptic stimulation, typically vibration. Challenges persist in creating haptic devices with compact designs that are able to create multiple types of haptic stimulations.

SUMMARY

Accordingly, there is a need for compact haptic devices that are able to create multiple haptic stimulations. Embodiments disclosed herein are directed toward haptic devices in different form factors with specific vibration profiles. These haptic devices can be used to create different haptic stimulations (e.g., vibrations, clicks, and rotation stimulations) in consumer devices (e.g., various wearable devices, including virtual and augmented reality devices).

In accordance with some embodiments, an apparatus for creating haptic stimulations is provided. The apparatus includes a body (sometimes called an outer housing) that includes opposing first and second ends. In some embodiments, the body is a bobbin (e.g., a bobbin-like housing). The body defines an inner cavity (sometimes called a bore or an internal channel) that extends from the first end to the second end of the body. The inner cavity defines a first opening at the first end and a second opening towards the second end. The second opening, smaller in diameter than the first opening, acts as a stop. In some embodiments, the stop is disposed inside the inner cavity, away from the second opening, while in other embodiments the stop is defined at the second end of the housing.

The apparatus also includes a pair of connectors, including a first connector positioned adjacent to the first end of the body and a second connector positioned adjacent to the second end of the body. In some embodiments, the connectors are insulation displacement connectors.

The apparatus further includes a wire that electrically connects the first connector to the second connector. The wire is wound (i) around a first portion of the body in a first direction and (ii) around a second portion of the body in a second direction opposite to the first direction. In some embodiments, the first direction is clockwise direction and the second direction is counter-clockwise direction, or vice versa.

In some embodiments, the wire is a continuous strand of magnet wire. In some embodiments, the wire is first passed through a slot in a pocket corresponding to the first connector before being wound around the first portion of the body in the first direction. At the end of the winding around the first portion, the wire is passed through a groove and then wound in the second direction around the second portion. At the end of the winding around the second portion, the wire is routed around into a slot in a pocket corresponding to the second connector. In some embodiments, the wire is wound in successive layers.

The apparatus also includes a ring magnet secured to an outer surface of the body. The ring magnet separates the first portion of the body from the second portion of the body. The apparatus further includes an armature magnet (sometimes called a driving magnet or a cylinder magnet) that is slidably positioned within the inner cavity of the body. In some embodiments, the armature magnet is configured to return to a position (e.g., a default position or a natural position) within the inner cavity after being displaced due to a magnetic pull from the ring magnet.

When a current is driven through the wire, simultaneous push and pull forces (sometimes called magnetomotive forces) are created by the current passing through the wire, causing the armature magnet to oscillate within the inner cavity. In some embodiments, oscillation of the armature magnet at a frequency (e.g., a predefined frequency) creates a vibration stimulation. When the magnitude of the current driven through the wire exceeds a threshold (which may be predetermined), the armature magnet is configured to impact or hit the stop of the inner cavity, causing a user of the apparatus to experience a "click" stimulation (e.g., a distinct haptic stimulation coupled with distinct audio created by the impact). In this way, a push (or pull) magnetomotive force is created instead of the simultaneous push and pull magnetomotive forces used for creating vibration.

In some embodiments, the inner cavity includes ferrofluid to dampen noise caused by oscillation of the armature magnet.

In some embodiments, the apparatus includes a Hall-effect sensor (or some other sensor) that is configured to detect the position of the armature magnet. In some embodiments, the Hall-effect sensor is mounted external to the body (e.g., attached to the second end of the body). In some embodiments, the Hall-effect sensor is normal to and centered on the axis of the inner cavity.

In some embodiments, the apparatus is coupled to a control system (sometimes called a controller) that modulates (or adjusts) the current driven through the wire according to (i) a delay in response and (ii) a desired oscillating frequency of the armature magnet. In some embodiments, during operation of the apparatus, the oscillating frequency of the armature magnet and/or the displacement of the armature magnet are determined based on the output of a sensor (e.g., a Hall-effect sensor) that provides feedback on the position of the armature magnet.

In some embodiments, the electric potential is delivered to the wire as an individual pulse (e.g., a 20 volt potential) so that the magnitude of the generated current exceeds the threshold (so as to create the "click" stimulation").

In some embodiments, the electrical potential (e.g., 5 volts) is delivered to the wire so as to match a desired oscillating frequency of the armature magnet.

In some embodiments, the armature magnet is configured to realign with the ring magnet (i.e., the armature magnet returns to the default or initial position when there is no current through the wire). In some embodiments, the armature magnet is configured to return to a position that is approximately near the center of the inner cavity.

In some embodiments, the armature magnet is 5 mm in diameter and 5 mm in length. Alternatively, in some embodiments, the armature magnet is three times as long as the ring magnet (or some other dimension larger than the ring magnet, such as twice as long or four times as long).

In some embodiments, the ring magnet comprises two magnetically coupled ring segment magnets. In some embodiments, the two ring segment magnets are positioned in respective grooves on the body and kept in their respective positions due to their mutual magnetic pull. Alternatively, in some embodiments, the ring magnet is a continuous magnetic, except for an opening that allows the wire to pass through.

In some embodiments, a size and length of the wire are configured so as to match a desired oscillating frequency (e.g., from 15-20 Hz up to 150-180 Hz) of the armature magnet.

In some embodiments, the armature magnet is displaced from its initial position by half a millimeter during oscillations.

In some embodiments, the haptic device is attached to the user's hand, while in other embodiments the haptic device is worn on other portions of the user's body (e.g., an arm, a wrist, or an ankle) and can be used to stimulate various areas of the body.

Thus, the devices, methods, and systems described herein provide a variety of benefits, including: (i) the ability to stimulate areas of the body that correspond to media content and sensor data and (ii) providing a compact device that can be used to create multiple distinct haptic stimulations.

In accordance with some embodiments, a haptic device includes one or more processors/cores and memory storing one or more programs configured to be executed by the one or more processors/cores. The one or more programs include instructions for performing the operations of any of the methods described herein. In accordance with some embodiments, a non-transitory computer-readable storage medium has stored therein instructions that, when executed by one or more processors/cores of a haptic device, cause the haptic device to perform the operations of any of the methods described herein. In accordance with some embodiments, a system includes a haptic device, a head-mounted display (HMD), and a computer system to provide video/audio feed to the HMD and instructions to the haptic device and the HMD.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures and specification.

FIGS. 8C and 8D illustrate haptic devices integrated with wearable devices in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another.

Figure 1:
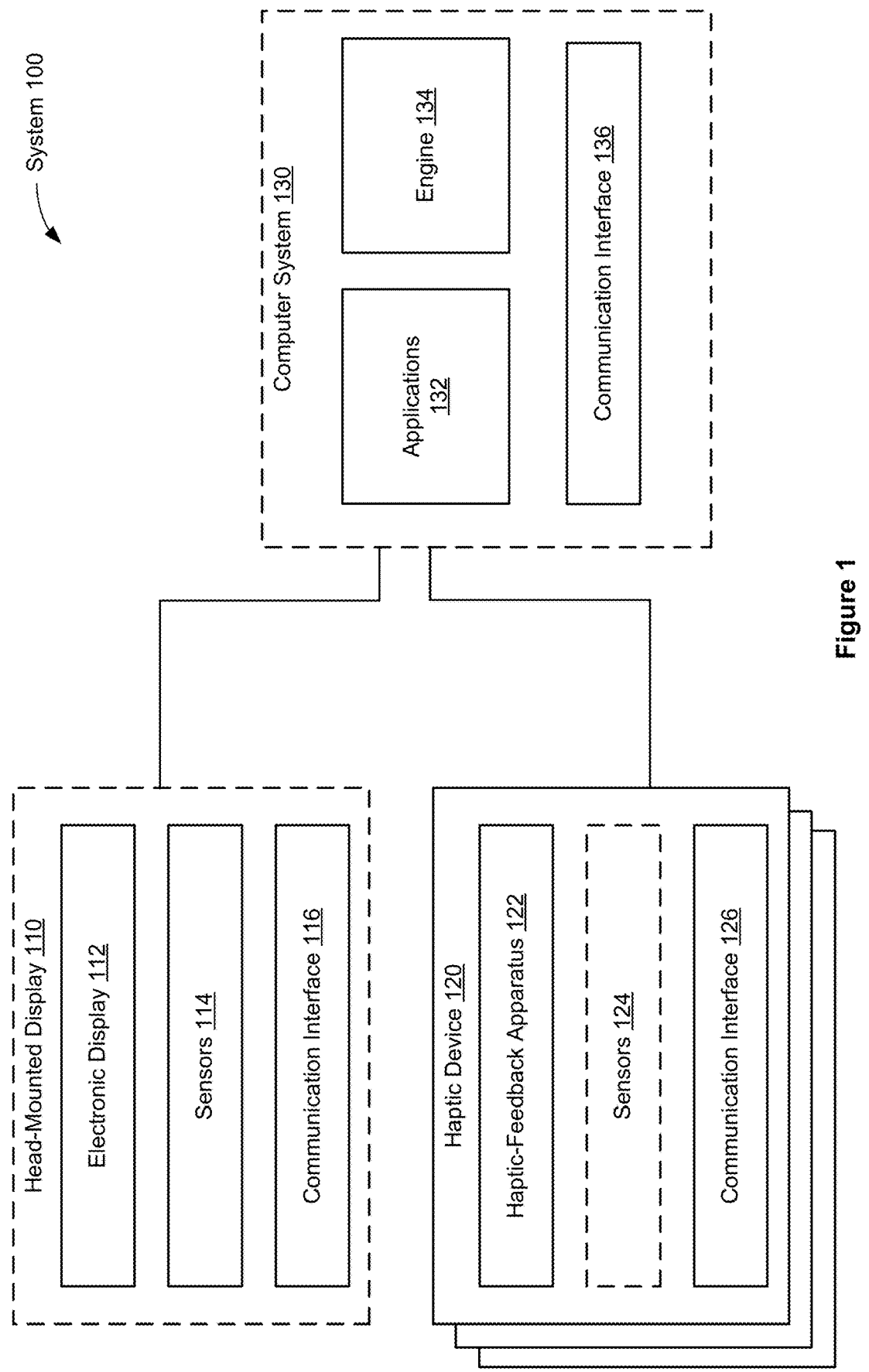
FIG. 1 is a block diagram of a haptics system in accordance with some embodiments.

FIG. 1 is a block diagram of a system 100 in accordance with various embodiments. While some example features are illustrated, various other features have not been illustrated for the sake of brevity and so as not to obscure pertinent aspects of the example embodiments disclosed herein. To that end, as anon-limiting example, the system 100 includes one or more haptic devices 120. In some embodiments, the one or more haptic devices 120 are used in conjunction with a computer system 130 (sometimes referred to a "remote computer system") and/or a head-mounted display 110 (e.g., a virtual-reality headset, an augmented reality system headset, or a mixed reality system). In some embodiments, the system 100 provides the functionality of a virtual-reality device with haptic feedback, an augmented reality device with haptic feedback, or a combination thereof. Additional examples of the system 100 are provided in FIGS. 9-11.

In some embodiments, the head-mounted display 110 presents media to a user. Examples of media presented by the head-mounted display 110 include images, video, audio, or some combination thereof. In some embodiments, audio is presented via an external device (e.g., speakers and/or headphones) that receives audio information from the head-mounted display 110, the computer system 130, or both, and presents audio data based on the audio information. Two examples of the head-mounted display 110 are provided in FIGS. 10 and 11. In some embodiments, the AR system 1000 and the VR system 1100 include both the head-mounted display 110 and the computer system 130.

In some embodiments, the head-mounted display 110 includes an electronic display 112, sensors 114, and a communication interface 116. The electronic display 112 displays images to the user in accordance with data received from the computer system 130. In various embodiments, the electronic display 112 may comprise a single electronic display 112 or multiple electronic displays 112 (e.g., one display for each eye of a user).

The sensors 114 include one or more hardware devices that detect spatial and motion information about the head-mounted display 110. Spatial and motion information can include information about the position, orientation, velocity, rotation, and acceleration of the head-mounted display 110. For example, the sensors 114 may include one or more inertial measurement units (IMUs) that detect rotation of the user's head while the user is wearing the head-mounted display 110. This rotation information can then be used (e.g., by the engine 134) to adjust the images displayed on the electronic display 112. In some embodiments, each IMU includes one or more gyroscopes, accelerometers, and/or magnetometers to collect the spatial and motion information. In some embodiments, the sensors 114 include one or more cameras positioned on the head-mounted display 110.

The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 114 from the head-mounted display 110 to the computer system 130. In such embodiments, the communication interface 116 may also receive audio/visual data to be rendered on the electronic display 112.

Figure 6A:
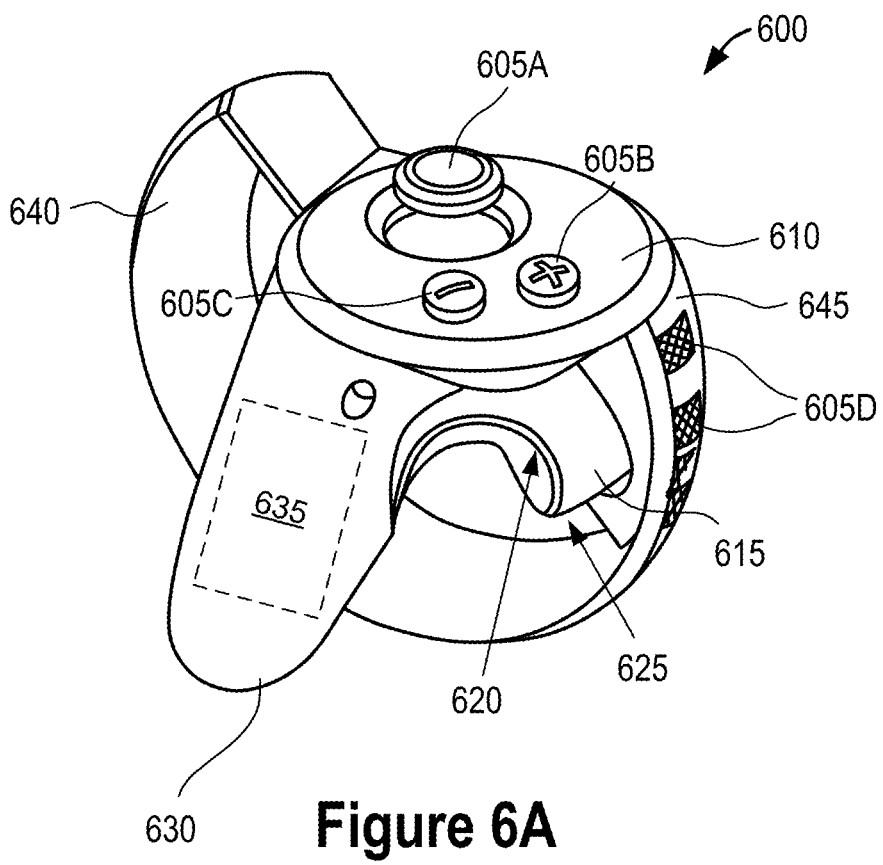
FIG. 6A illustrates an isometric view of an example hand-held controller that includes one or more haptic devices in accordance with some embodiments.
Figure 6B:
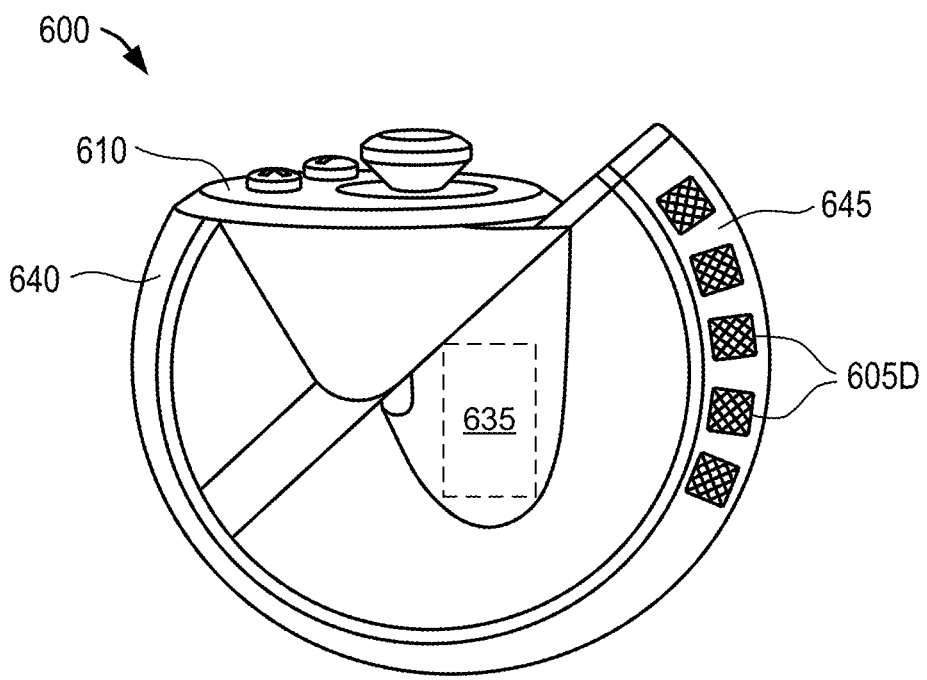
FIG. 6B illustrates another isometric view of an example hand-held controller that includes one or more haptic devices in accordance with some embodiments.

In some embodiments, the haptic device 120 is integrated with a wearable device, which includes a garment worn by the user (e.g., a glove, a shirt, or pants). In other embodiments, the haptic device 120 is integrated with another device, such as a game controller (as shown in FIGS. 6A and 6B). The haptic device 120 includes a haptic-feedback apparatus 122, (optionally) haptic sensors 124, and a communication interface 126. The haptic device 120 may include additional components that are not shown in FIG. 1, such as a power source (e.g., an integrated battery, a connection to an external power source, a container containing compressed air, or some combination thereof), one or more processors, and memory.

The haptic device 120 is configured to provide haptic feedback (i.e., haptic stimulations or haptic cues) to the user. To accomplish this, the haptic device 120 includes one or more haptic-feedback apparatuses 122, which are configured to create haptic stimulations for a user of the haptic device. As will be explained in greater detail below, the haptic-feedback apparatuses 122 are able to create different haptic stimulations by acting alone, or by acting in consort. The haptic device 120 is configured to create at least two distinct haptic stimulations: vibration and clicks.

In some embodiments, the haptic sensors 124 include one or more hardware devices that detect spatial and motion information about the haptic device 120. Spatial and motion information can include information about the position, orientation, velocity, rotation, and acceleration of the haptic device 120, a device in which the haptic device 120 is integrated with, or any subdivisions of the haptic device 120, such as fingers, fingertips, knuckles, the palm, or the wrist when the haptic device 120 is part of a glove. The haptic sensors 124 may be IMUs, as discussed above with reference to the sensors 114. In some embodiments, the sensors 124 may also include feedback sensors (e.g., a laser displacement sensor, a force or pressure sensor, a motor encoder, or a Hall-effect sensor, an accelerometer, or a magnetometer). In some embodiments, the sensors 124 are used to measure a position of the armature magnet 226 (discussed below).

The haptic communication interface 126 enables input and output to the computer system 130. In some embodiments, the haptic communication interface 126 is a single communication channel, such as USB. In other embodiments, the haptic communication interface 126 includes several distinct communication channels operating together or independently. For example, the communication interface 126 may include separate communication channels for receiving control signals for the haptic-feedback apparatus 122 and sending data from the haptic sensors 124 to the computer system 130. The one or more communication channels of the haptic communication interface 126 can be implemented as wired or wireless connections. In some embodiments, the haptic communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

In some embodiments, the computer system 130 is a computing device that executes applications 132 (e.g., virtual-reality applications, augmented-reality applications, mixed reality application, and the like) to process input data from the sensors 114 on the head-mounted display 110 and the haptic sensors 124 on the haptic device 120. In some embodiments, the computer system 130 provides output data for (i) the electronic display 112 on the head-mounted display 110, and/or (ii) the haptic device 120 (e.g., processors of the haptic device 120). In some embodiments, the systems in FIGS. 9-11 each include an instance of a computer system 130.

In some embodiments, the computer system 130 sends instructions (e.g., the output data) to the haptic device 120 using a communication interface 136. In response to receiving the instructions, the haptic device 120 creates one or more haptic stimulations (e.g., using the haptic-feedback apparatus 122). Alternatively, in some embodiments, the computer system 130 sends instructions to an external device, such as a wearable device, a game controller (e.g., game controller 600, FIGS. 6A and 6B), or some other Internet of things (IOT) device, and in response to receiving the instructions, the external device creates one or more haptic stimulations through the haptic device 120 (e.g., the output data bypasses the haptic device 120). Although not shown, in the embodiments that include a distinct external device, the external device may be connected to the head-mounted display 110, the haptic device 120, and/or the computer system 130 via a wired or wireless connection.

The computer system 130 can be implemented as any kind of computing device, such as an integrated system-on-a-chip, a microcontroller, a console, a desktop or laptop computer, a server computer, a tablet, a smart phone, or other mobile device. Thus, the computer system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either a wired or a wireless interface. The I/O interface interfaces the processor to peripherals (not shown) such as, for example and depending upon the computing device, sensors, displays, cameras, color sensors, microphones, keyboards, and USB devices.

In the example shown in FIG. 1, the computer system 130 includes applications 132 (e.g., virtual-reality applications, augmented-reality applications, mixed-reality application, and/or the like) and an engine 134 (e.g., a virtual-reality engine or a controller for the haptic device 120). In some embodiments, the applications 132 and the engine 134 are implemented as software modules that are stored on the storage device and executed by the processor. Some embodiments of the computer system 130 include additional or different components than those described in conjunction with FIG. 1. Similarly, the functions further described below may be distributed among components of the computer system 130 in a different manner than is described here.

In some embodiments, each application 132 is a group of instructions that, when executed by a processor, generates content for presentation to the user. An application 132 may generate content in response to inputs received from the user via movement of the head-mounted display 110 or the haptic device 120. Examples of applications 132 include gaming applications, conferencing applications, and video playback applications.

In some embodiments, the engine 134 is a software module that allows applications 132 to operate in conjunction with the head-mounted display 110 and/or the haptic device 120. In some embodiments, the engine 134 receives information from the sensors 114 on the head-mounted display 110 and provides the information to an application 132. Based on the received information, the engine 134 determines media content to provide to the head-mounted display 110 for presentation to the user via the electronic display 112 and/or a type of haptic feedback to be created by the haptic device 120. For example, if the engine 134 receives information from the sensors 114 on the head-mounted display 110 indicating that the user has looked to the left, the engine 134 generates content for the head-mounted display 110 that mirrors the user's movement in a virtual environment. As another example, if the user hits a wall, the engine 134 generates control signals for the haptic-feedback apparatus 122 to generate a strong vibration or a click sound to alert the user.

Similarly, in some embodiments, the engine 134 receives information from the haptic sensors 124 on the haptic device 120 and provides the information to an application 132. The application 132 can use the information to perform an action within the virtual world of the application 132. For example, if the engine 134 receives information from the sensors 124 that the user has raised his hand and hit a wall, a simulated hand in the application 132 lifts to a corresponding height. In some embodiments, the engine 134 generates control signals for the haptic-feedback apparatus 122 to generate either a vibration or a click to alert the user. As noted above, the information received by the engine 134 can also include information from the head-mounted display 110. For example, cameras on the head-mounted display 110 may capture movements of the haptic device 120, and the application 132 can use this additional information to perform the action within the virtual world of the application 132.

The engine 134 may also provide feedback to the user that the action was performed. The provided feedback may be visual via the electronic display 112 in the head-mounted display 110 and/or haptic via one or more of the haptic-feedback apparatus 122 in the haptic device 120. For example, if a haptic device 120 is attached to a user's forearm, one or more haptic-feedback apparatus 122 of the haptic device 120 may create one or more vibratory sensations on the user's forearm to simulate the sensation of an avatar in a virtual-reality video game touching the arm of the user's avatar. To do this, in some embodiments, the haptic device 120 activates a haptic-feedback apparatus 122 based on an instruction from the computer system 130. A representative haptic-feedback apparatus 122 is discussed below with reference to FIGS. 2A-2C, 3, 4, and 5A-5C.

As mentioned above, in some embodiments, the haptic stimulations created by the haptic device 120 can correspond to data displayed by the head-mounted display 110 (e.g., an avatar touching the user's avatar). Thus, the haptic device 120 is used to further immerse the user in virtual and/or augmented reality experience such that the user not only sees (at least in some instances) the data on the head-mounted display 110, but the user may also "feel" certain aspects of the displayed data. Moreover, in some embodiments, the haptic device 120 is designed to not restrict movement of the user's body. Consequently, the wearer experiences far less unwanted encumbrances when wearing the haptic device 120, relative to conventional wearable haptic devices. The computer system 130 also has a communication interface 136, which can be used to communicate with the head mounted display 110, the haptic device 120, and/or other devices.

In some embodiments, the haptic device 120 further includes one or more processing units (e.g., CPUs, microprocessors, and the like), a communication interface 126 (as discussed above), memory, and one or more communication buses for interconnecting these components (sometimes called a chipset), in addition to the haptic-feedback apparatus 122. In some embodiments, the haptic device 120 includes one or more sensors 124 as discussed above. In some embodiments, the haptic device 120 includes a power supply, such as a battery, to power its various components. Alternatively, in some implementations, the power supply is part of a wearable device in which the haptic device 120 is integrated.

In some embodiments, the memory in the haptic device 120 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within memory, includes a non-transitory computer-readable storage medium. In some embodiments, the memory, or the non-transitory computer-readable storage medium of the memory, stores the following programs, modules, and data structures, or a subset or superset thereof:

operating logic, including procedures for handling various basic system services and for performing hardware dependent tasks;

a communication module, which couples to and/or communicates with remote devices (e.g., the computer system 130, other wearable devices, or other haptic devices) in conjunction with the communication interface 126;

a sensor module, which obtains and processes sensor data (e.g., in conjunction with sensors 124) to, for example, determine an orientation of the haptic device 120 and determine states of the haptic-feedback apparatus 122 (e.g., a position of the armature magnet 226);

a stimulation generating module, which actuates the feedback apparatus 122 to create haptic stimulations. In some embodiments, the module also includes or is associated with a characteristic selection module, which is used to select values (e.g., frequency of vibrations or the strength of the haptic click) of control for feedback apparatus 122; and a database, which stores:
    sensor information, including data received, detected, and/or transmitted by one or more sensors (e.g., the sensors 124 or one or more remote sensors);
    device settings, including operational settings for the haptic device 120 and/or one or more remote devices (e.g., selected values or profiles for actuation); and
    communication protocol information, including protocol information for one or more protocols (e.g., custom or standard wireless protocols, such as Zig-Bee, Z-Wave, etc., and/or custom or standard wired protocols, such as Ethernet).

In some embodiments, the characteristic selection module of the stimulation generating module may be used to select a particular frequency at which a haptic-feedback apparatus 122 is to operate at. As discussed above, other characteristics for actuations may include a strength of the haptic click. In some embodiments, the selection module selects the values based on information received from the computer system 130 (as explained in greater detail below). In some embodiments, the computer system 130 includes the selection module and provides the relevant characteristics to the haptic device 120.

In some embodiments, each haptic device 120 includes a unique identifier stored in the database. In some embodiments, the haptic device 120 sends the unique identifier to the computer system 130 to identify itself to the computer system 130. This is particularly useful when multiple haptic devices are being used concurrently. In this way, the computer system 130 can quickly determine which haptic device to activate (e.g., create stimulation with).

Each of the above-identified elements (e.g., modules stored in memory of the haptic device 120) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory stores a subset of the modules and data structures identified above. Furthermore, in some embodiments, the memory stores additional modules and data structures not described above.

In some embodiments, a master microcontroller communicates with multiple microcontrollers, which then drive the haptic device 120 (e.g., one haptic device 120 in an array of haptic devices). In some embodiments, an op amp is used to amplify the ac input to the haptic device 120.

In some embodiments, the representative haptic device 120 is configured to provide at least two different haptic stimulations to a wearer/user of the haptic device 120: (i) vibration and (ii) click. In some embodiments, the representative haptic device 120 creates each of the haptic stimulations separately. Alternatively, in some other embodiments, the representative haptic device 120 creates two or more of the haptic stimulations simultaneously or in sequence. For example, the haptic device 120 may combine a vibration stimulation with a click stimulation (e.g., one stimulation is followed by another in quick succession). In doing so, the haptic device 120 is able to convey at least two dimensions of information to the wearer of the haptic device 120. For example, a vibration alone may convey a first message (or first information) to the wearer, a click alone may convey a second message (or second information) to the wearer, and a vibration combined with a click may convey a third message (or third information) to the wearer. The haptic device 120 has a compact design, which is able to create distinct and distinguishable haptic stimulations.

Figure 2A:
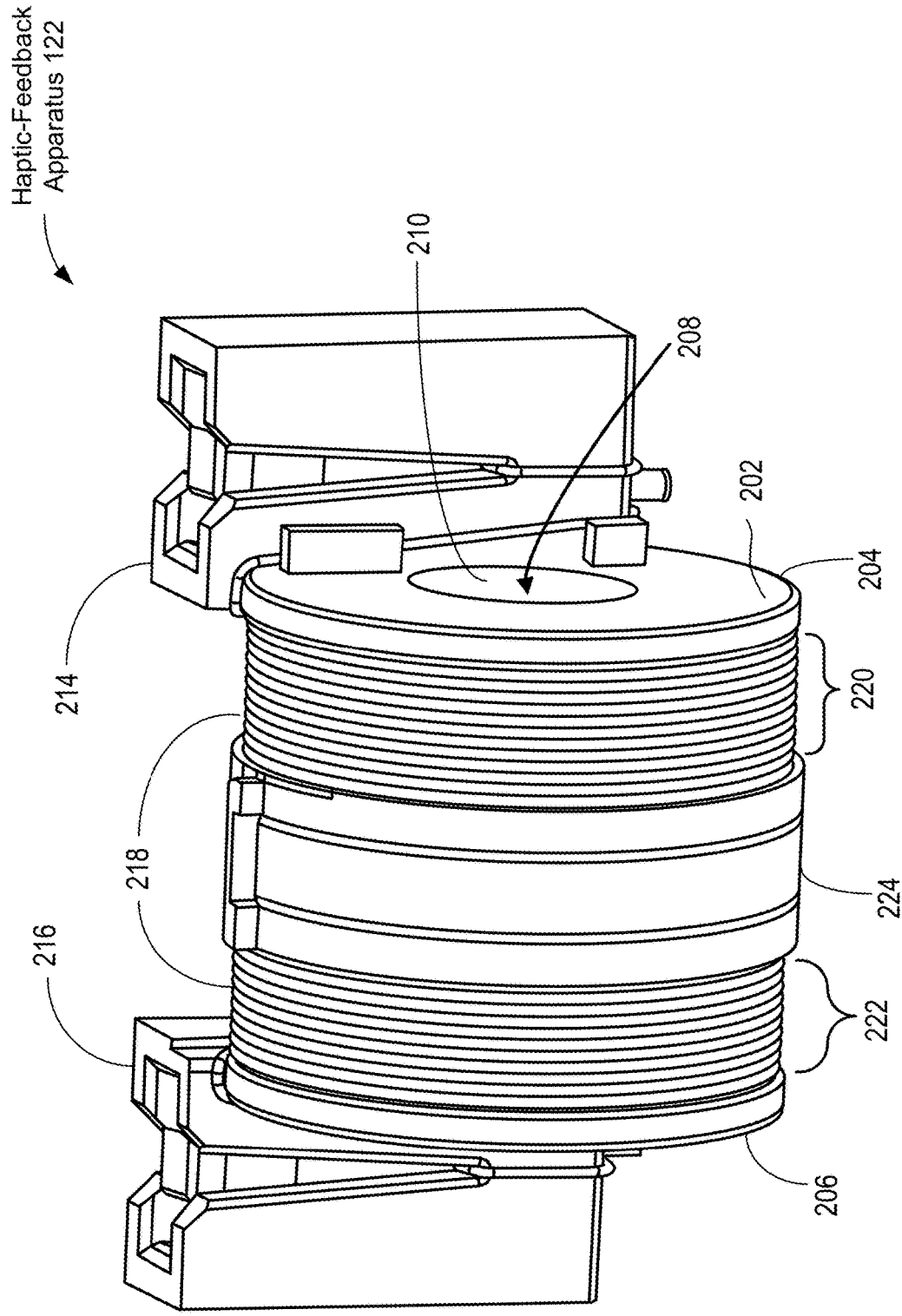
FIG. 2A shows a top view of a representative haptic-feedback apparatus in accordance with some embodiments.
Figure 2B:
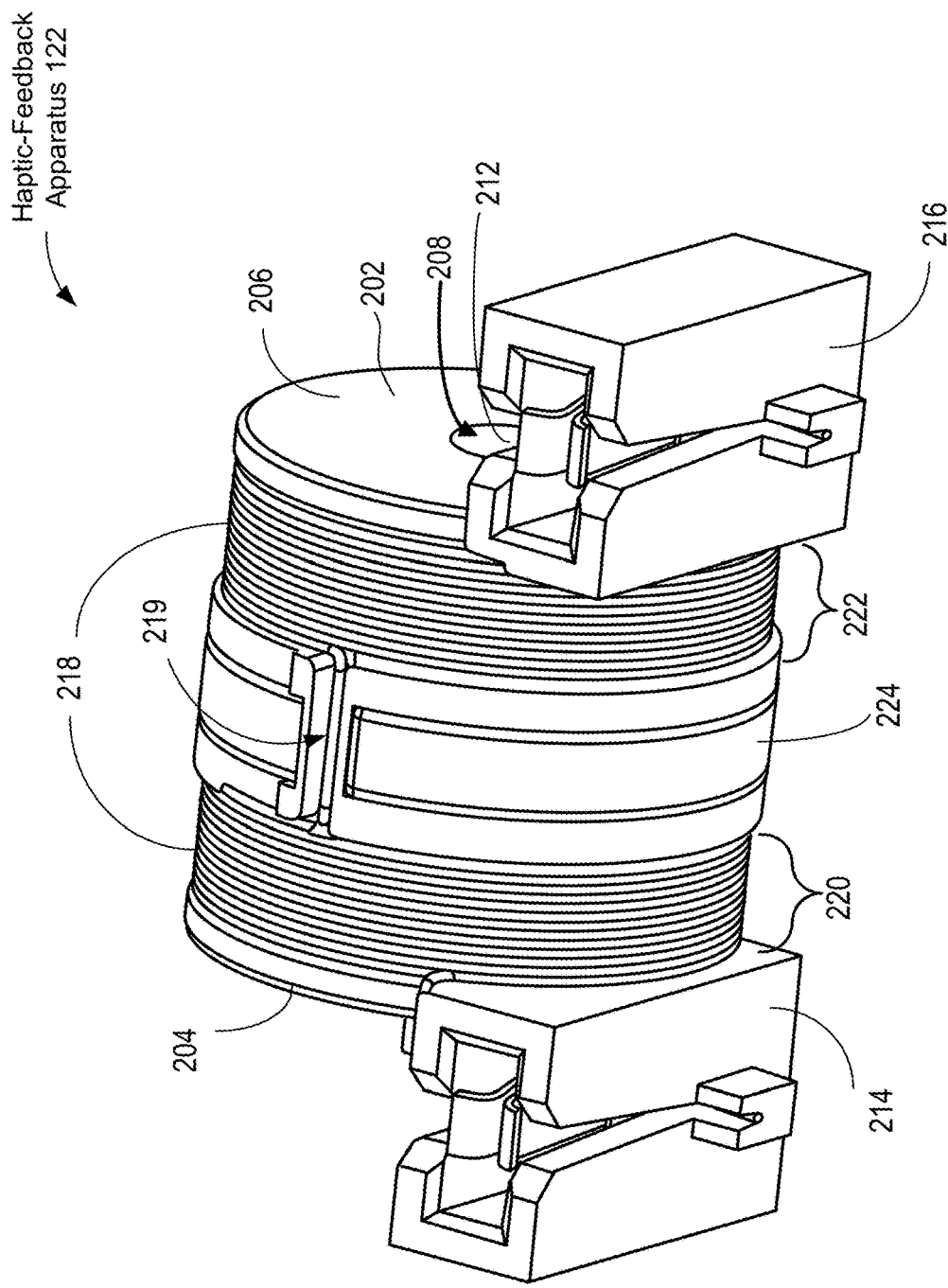
FIG. 2B shows an isometric view of a representative haptic-feedback apparatus in accordance with some embodiments.
Figure 2C:
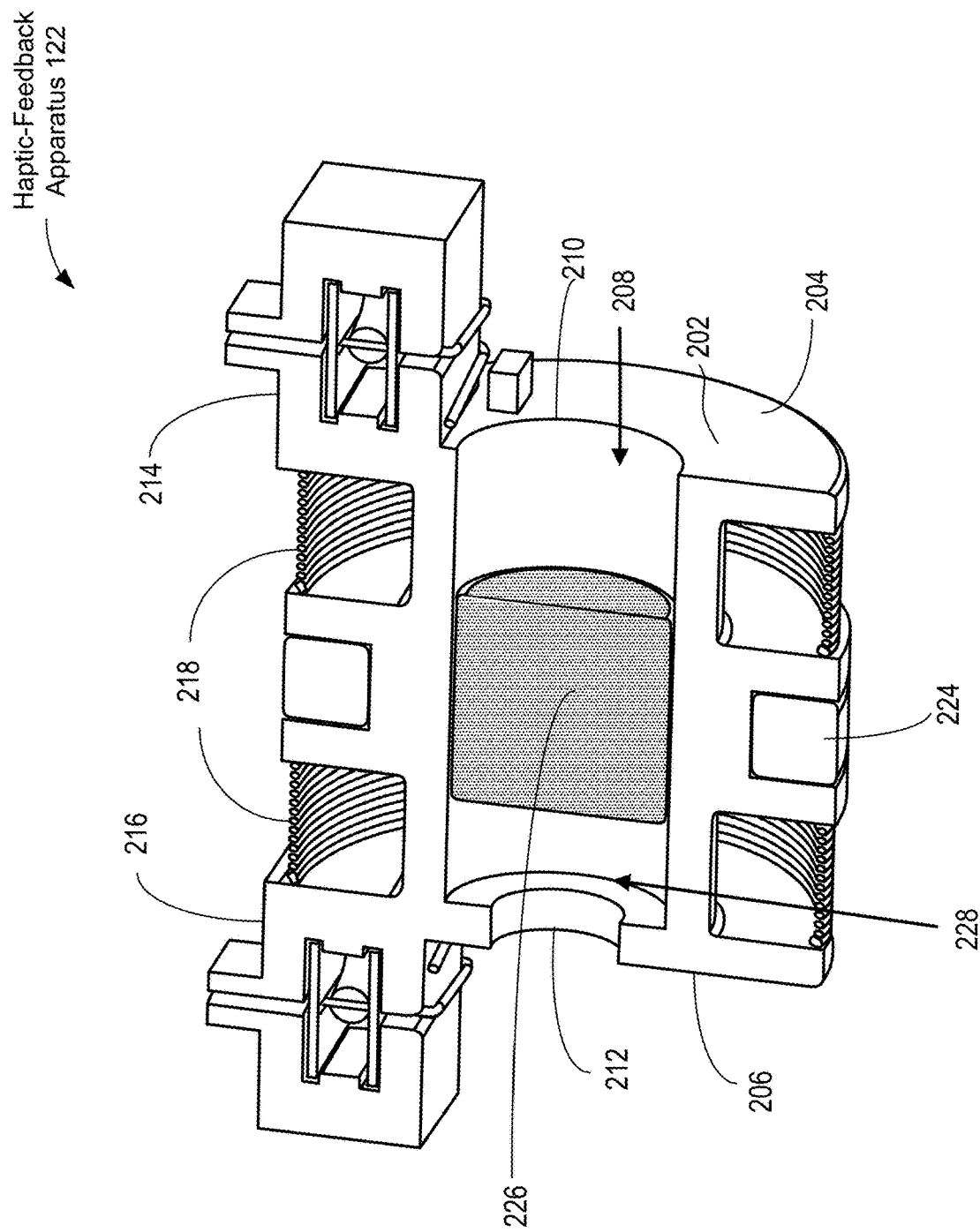
FIG. 2C shows a cross-sectional view of a representative haptic-feedback apparatus in accordance with some embodiments.

FIG. 2A shows a top view of a representative haptic-feedback apparatus 122 in accordance with some embodiments. FIG. 2B shows an isometric view of a representative haptic-feedback apparatus 122 in accordance with some embodiments. FIG. 2C shows a cross-sectional view of a representative haptic-feedback apparatus 122 in accordance with some embodiments. The apparatus 122 (sometimes called a linear motor) is described in reference to FIGS. 2A-2C.

The apparatus 122 includes a body 202 (sometimes called an outer housing or a housing) that includes a first end 204 and a second opposing end 206. In some embodiments, the body 202 is a bobbin (e.g., a bobbin-like housing). The body 202 defines an inner cavity 208 (sometimes called a bore or an internal channel) that extends from the first end to the second end of the body. The inner cavity 208 defines a first opening 210 (as shown in FIGS. 2A and 2C) at the first end and a second opening 212 (as shown in FIGS. 2B and 2C) towards the second end. The second opening, smaller in diameter than the first opening 210, acts as a stop 228 (FIG. 2C). In some embodiments, the stop 228 is disposed inside the inner cavity, away from the second opening 212, while in other embodiments, the stop 228 is defined at the second end 206 of the housing 202.

The apparatus 122 also includes a pair of connectors, including a first connector 214 positioned adjacent to the first end 204 of the body 202 and a second connector 216 positioned adjacent to the second end 206 of the body 202. In some embodiments, the connectors 214 and 216 are insulation displacement connectors.

The apparatus 122 further includes a wire 218 that electrically connects the first connector 214 to the second connector 216. The wire 218 is (i) wound around a first portion 220 of the body 202 in a first direction and (ii) wound around a second portion 222 of the body 202 in a second direction opposite to the first direction. In some embodiments, the first direction is clockwise direction and the second direction is counter-clockwise direction, or vice-versa. In some embodiments, the wire 218 is a continuous strand of magnet wire.

In some embodiments, the wire 218 is first passed through a slot in a pocket corresponding to the first connector 214 before being wound around the first portion 220 of the body 202 in the first direction. At the end of the winding around the first portion 220, the wire 218 is passed through a groove 219 and then wound in the second direction around the second portion 222. At the end of the winding around the second portion 222, the wire 218 is routed into a slot in a pocket corresponding to the second connector 216. In some embodiments, the wire 218 is wound in successive layers.

The apparatus 122 also includes a ring magnet 224 secured to an outer surface of the body 202. The ring magnet 224 separates the first portion 220 of the body from the second portion 222 of the body 202. The apparatus 122 further includes an armature magnet 226 (sometimes called a driving magnet or a cylinder magnet) that is slidably positioned within the inner cavity 208 of the body 202. In some embodiments, the armature magnet 226 is configured to return to a position (e.g., a default position or a natural position) within the inner cavity 208, after being displaced, due to a magnetic pull from the ring magnet 224.

When a current is driven through the wire 218, simultaneous push and pull forces (sometimes called magnetomotive forces) are created by the current passing through the wire 218, causing the armature magnet 226 to oscillate within the inner cavity 208 to create vibration. In some embodiments, oscillation of the armature magnet 226 at a frequency (e.g., a predefined frequency) creates a vibration stimulation. To illustrate further (as also described below in reference to FIGS. 5A-5C), the armature magnet 226 is aligned with the ring magnet 224 in its default position. When current is passed through the wire 218, the current through the first portion 220 of the body 202 causes an electro-magnetic pull force on the armature magnet 226 and the current through the second portion 222 of the body 202 causes an electro-magnetic push force on the armature magnet. The push and the pull forces cause the armature magnet 226 to displace from its default position (towards the first portion 220 of the body 202) by overcoming the magnetic pull from the ring magnet 224. The current direction is subsequently reversed. The current through the second portion 222 of the body 202 causes an electro-magnetic pull force on the armature magnet 226 and the current through the first portion 220 of the body 202 causes an electro-magnetic push force on the armature magnet 226. The push and the pull forces cause the armature magnet 226 to displace from its default position (towards the second portion 222 of the body 202) by overcoming the magnetic pull from the ring magnet 224. Thus, by repeating the alternating current, the magnetic pull and push forces are reversed in quick succession (e.g., at a desired frequency) to thereby cause the armature magnet 226 to oscillate. In some embodiments, the voltage (e.g., 5 volts) is delivered to the wire 218 so as to match a desired oscillating frequency of the armature magnet 226.

When the magnitude of the current driven through the wire 218 exceeds a threshold, the armature magnet 226 is configured to impact or hit the stop 228 of the inner cavity 208, causing a user of the apparatus 122 to experience a "click" stimulation (e.g., a distinct haptic stimulation coupled with distinct audio created by the impact). In this way, a push (or pull) magnetomotive force is created instead of the simultaneous push and pull magnetomotive force used for creating vibration. In some embodiments, the current is delivered to the wire 218 as an individual pulse (e.g., a 20 volt pulse) so that the magnitude of the current exceeds the threshold (so as to create the "click" stimulation").

In some embodiments, the inner cavity 208 includes ferrofluid to dampen noise caused by oscillation of the armature magnet 226.

Figure 3:
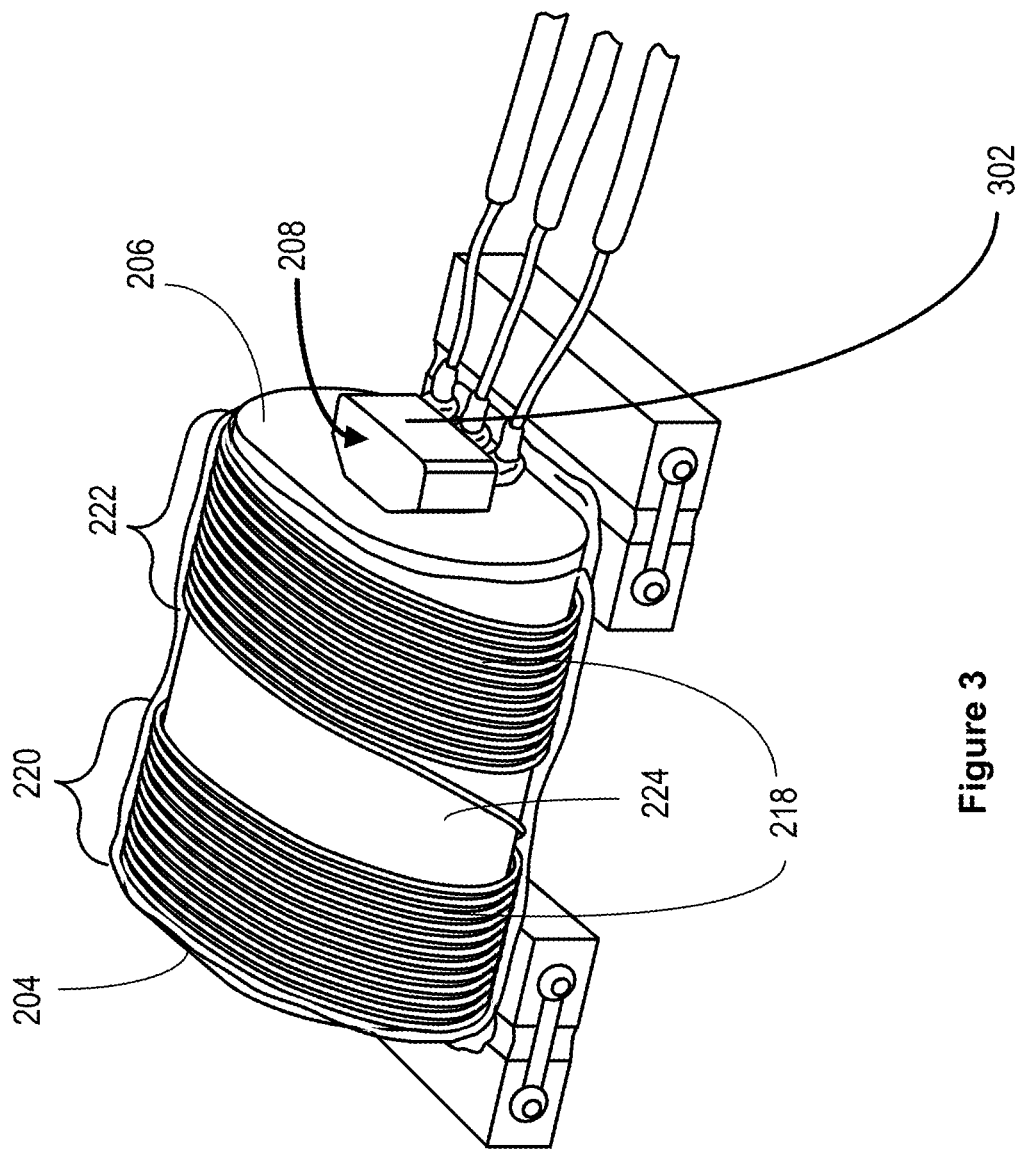
FIG. 3 illustrates a representative haptic-feedback apparatus with a Hall-effect sensor attached to the apparatus in accordance with some embodiments.

In some embodiments, the apparatus 122 includes a Hall-effect sensor configured to detect a position of the armature magnet 226. In some embodiments, the Hall-effect sensor is mounted external to the body 202 (e.g., attached to the second end of the body, as shown in FIG. 3). In some embodiments, the Hall-effect sensor is normal to and centered on the axis of the inner cavity 208. FIG. 3 illustrates a setup where a Hall-effect sensor 302 is attached to the representative haptic-feedback apparatus 122 in accordance with some embodiments.

In some embodiments, the apparatus 122 is coupled (e.g., electrically or communicatively coupled via the interface 126 and/or the interface 136) to a control system (sometimes called a controller, such as the engine 134 of the computer system 130) that modulates (or adjusts) the current driven through the wire 218 according to (i) a delay in response and (ii) a desired oscillating frequency of the armature magnet 226. In some embodiments, during operation of the apparatus 122, the oscillating frequency of the armature magnet 226 and/or the displacement of the armature magnet 226 are determined based on an output of a sensor (e.g., a Hall-effect sensor) that provides feedback on the position of the armature magnet 226.

In some embodiments, the armature magnet 226 is configured to realign with the position of the ring magnet 224 (i.e., the armature magnet 226 returns to the default position when the current is no longer driven through the wire 218). In some embodiments, the armature magnet 226 is configured to return to a position that is approximately near the center of the inner cavity 208.

In some embodiments, the armature magnet 226 is 5 mm in diameter and 5 mm in length. Alternatively, in some embodiments, the armature magnet 226 is three times as long as the ring magnet 224 (or some other dimension larger than the ring magnet 224, e.g., twice as long or four times as long). In some embodiments, the dimensions of the armature magnet 226 and/or the ring magnet 224 are determined (e.g., at the time of calibration of the apparatus 122) based on the desired oscillating frequency of the armature magnet 226. For example, if the length of the armature magnet 226 is twice as long as the ring magnet 224, the armature magnet 226 may be more easily displaced, facing less resistance to move, from its normal or default position compared to when the armature magnet 226 is three times as long as the ring magnet 224.

In some embodiments, the ring magnet 224 comprises two magnetically coupled ring segment magnets. In some embodiments, the two ring segment magnets are positioned in respective grooves (shown in FIG. 2C) on the body 202 and kept in their respective positions due to their mutual magnetic pull. Alternatively, in some embodiments, the ring magnet is a continuous magnet, except for an opening that allows the wire to pass through.

In some embodiments, the size and length of the wire 218 are configured or determined (e.g., at the time of calibration of the apparatus 122) so as to match the desired oscillating frequency (e.g., from 15-20 Hz up to 150-180 Hz) of the armature magnet 226.

In some embodiments, the armature magnet 226 is displaced (as described below in reference to FIGS. 5A-5C) from its initial position by half a millimeter during oscillations.

To illustrate further, in some embodiments, the apparatus 122 includes a bobbin-like housing 202. A continuous strand of magnet wire 218 is wound on the bobbin. The wire 218 initially passes through a slot (not shown) in an insulation displacement connector (IDC) pocket. The wire 218 is routed over an outer flange of the bobbin 202, and wound in a first direction (e.g., in successive layers). At the end of the outer winding layer, the wire 218 is passed through a groove 219 and is then wound in a second direction. The wire 218 is finally routed into the other IDC pocket. IDC connectors are then inserted into the pockets. In some embodiments, insulation is cut to make contact with a copper core. A sliding armature magnet 226 (e.g., a cylinder magnet that is 5 mm in diameter and 5 mm in length) is placed in the bore or the inner cavity of the bobbin. Two ring magnet segments 224 are placed into their respective grooves on the outer body of the bobbin, as shown in FIG. 2C. The ring magnets 224 are held in place by magnetic forces. This magnetic pull or balance also centers the armature magnet 226, and acts like a spring returning the armature magnet 226 to center of the inner cavity of the body when displaced. Note that in some embodiments, the ring magnet 224 is a single magnet (i.e., not composed of segments).

In some embodiments, an alternating current run through the apparatus 122 causes the apparatus 122 to develop simultaneous push and pull forces (sometimes called magnetomotive forces) causing the armature magnet 226 to oscillate within the bore 208 to create vibration. Single haptic "click" events are achieved by individual pulses of current sufficient enough to drive the armature magnet 226 in one direction against a stop 228 at one end of the bore. In some embodiments, the apparatus is 22 mm in length (e.g., the distance between insulation displacement pockets where the connectors are inserted) and 13 mm in width (outer diameter of the ring magnet 224).

In some embodiments, during calibration of the apparatus 122, simulations are performed to determine appropriate geometry, configuration, and/or winding specifications. Some embodiments can be used to design specific vibration profiles. In some embodiments, the apparatus 122 plugs into position on two sheet metal tabs within a haptic device 120.

Figure 2D:
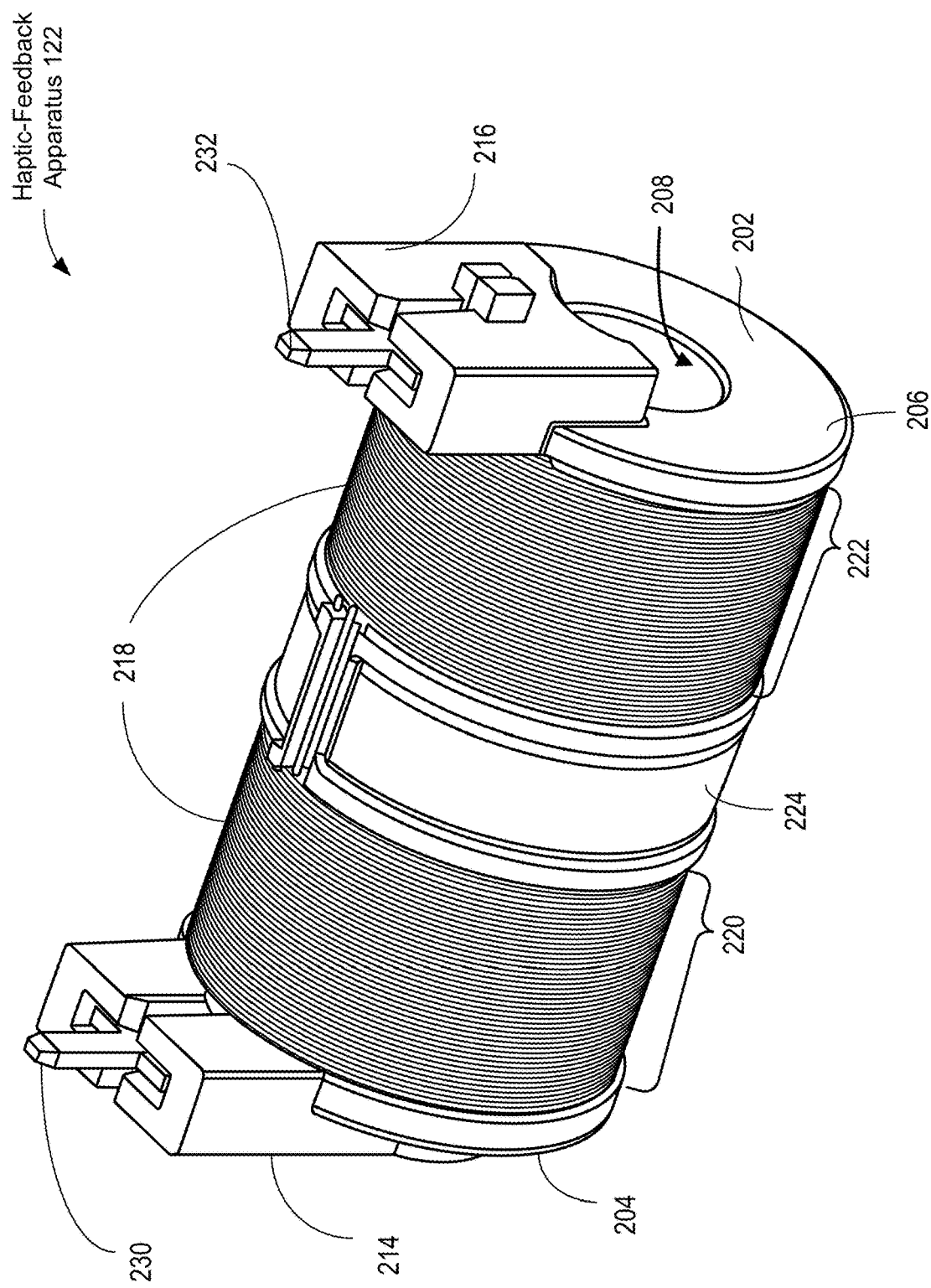
FIG. 2D shows an isometric view of a representative haptic-feedback apparatus in accordance with some embodiments.
Figure 2E:
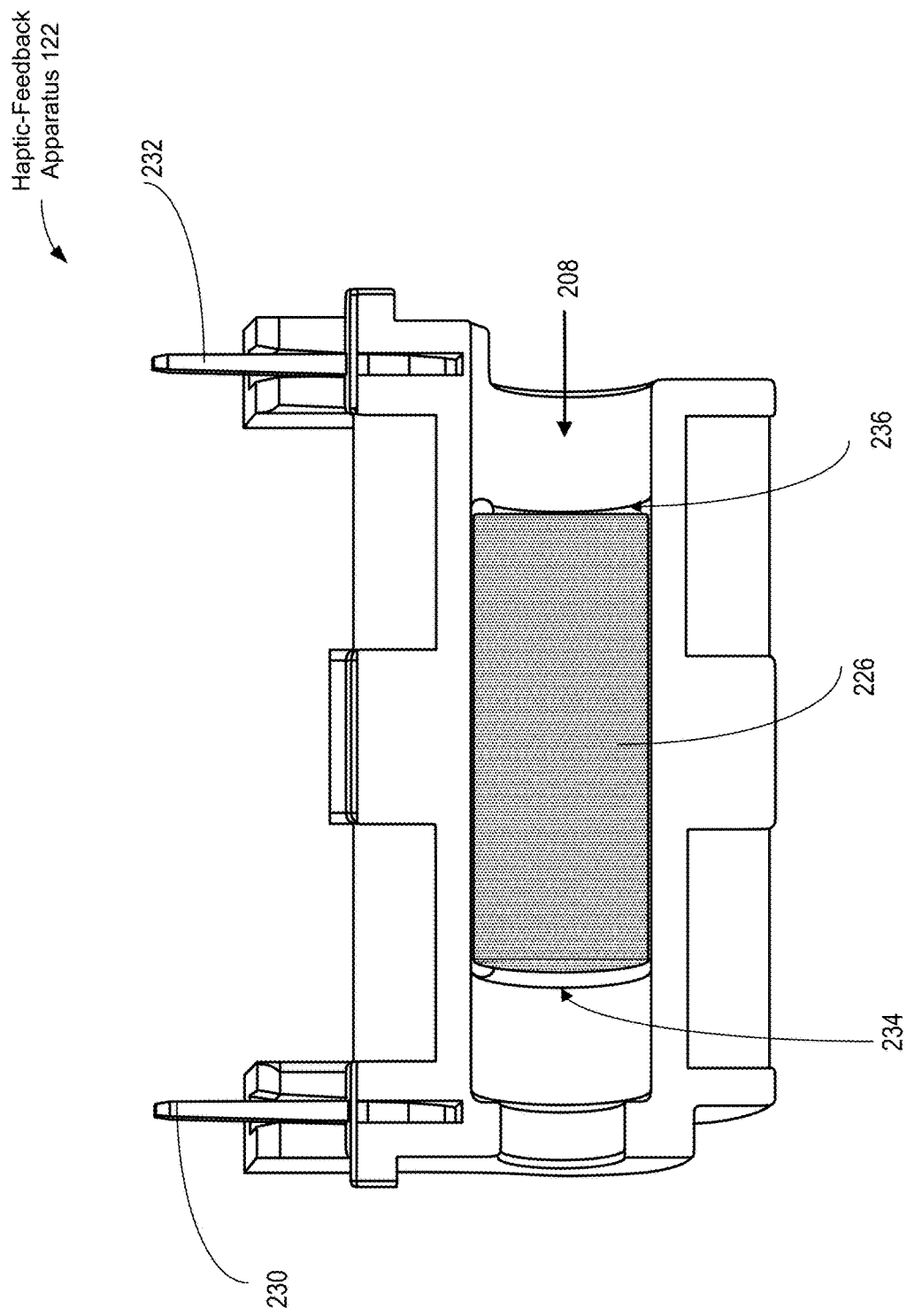
FIG. 2E shows a cross-sectional view of a representative haptic-feedback apparatus in accordance with some embodiments.

FIG. 2D shows an isometric view of a representative haptic-feedback apparatus 122 in accordance with some embodiments. FIG. 2E shows a cross-sectional view of a representative haptic-feedback apparatus 122 in accordance with some embodiments. Similar to the apparatus described above in reference to FIGS. 2A-2C, the apparatus 122 shown in FIGS. 2D and 2E includes a pair of connectors with a first connector 214 positioned adjacent to the first end 204 of the body and a second connector 216 positioned adjacent to the second end 206 of the body. However, unlike FIGS. 2A-2C, the pair of connectors shown in FIGS. 2D and 2E are oriented perpendicular to the bore 208. In some embodiments, the first connector 214 is coupled (e.g., attached) to the first end 204 of the body, and the second connector 216 is coupled (e.g., attached) to the second end 206 of the body. In some embodiments, the first connector 214 includes a lead 230 and the second connector 216 includes a lead 232. In some embodiments, the leads 20 and 232 are used to through-hole solder to a printed circuit board assembly (PCBA). In some embodiments, a Hall-effect sensor is mounted on the PCBA. In some embodiments, the Hall-effect sensor is configured to detect a position of the armature magnet 226 within the bore 208.

FIG. 2E illustrates ferromagnetic fluid (sometimes called ferrofluid) in the shape of donuts 234 and 236 at the ends of the armature magnet 226, in accordance with some embodiments. In some embodiments, the ferromagnetic fluid includes fine iron particles suspended in a liquid carrier. In some embodiments, during operation, the fluid collects and remains in these positions 234 and 236, and/or any position where the magnetic field has its highest density. In some embodiments, the ferromagnetic fluid acts as a bearing for the armature magnet's linear motion. In some embodiments, the ferromagnetic fluid acts as a damper to reduce the noise associated with the armature magnet 226 impacting the bore 208 as it reverses direction. Note that the apparatus 122 illustrated in FIGS. 2A-2C may also include ferromagnetic fluid.

Figure 4:
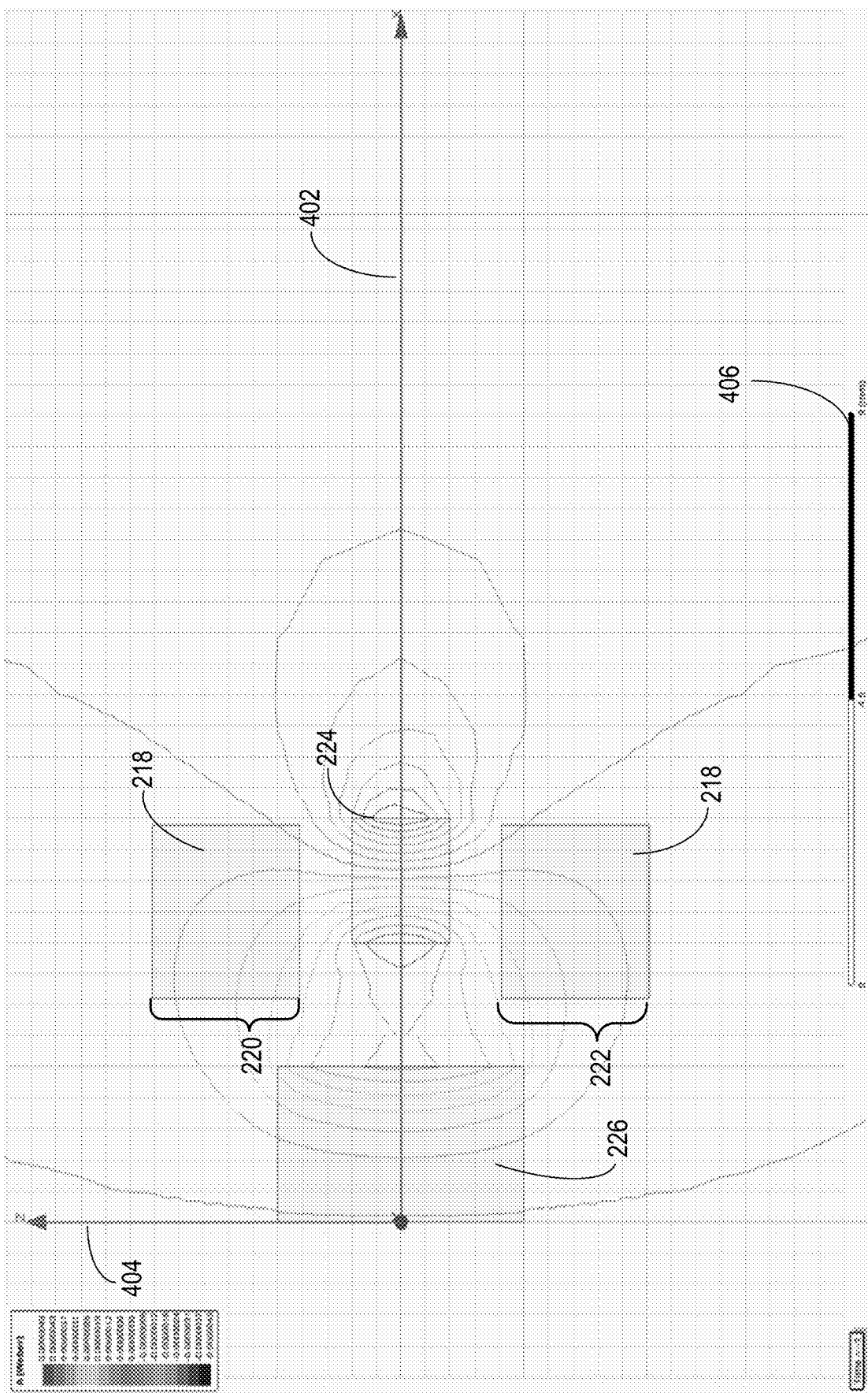
FIG. 4 illustrates a magnetic field diagram/plot of a representative haptic-feedback apparatus in accordance with some embodiments.

FIG. 4 illustrates a magnetic field diagram/plot of a representative haptic-feedback apparatus 122 in accordance with some embodiments. The relative position of the components of the apparatus 122 are shown along two axes (the x-axis 402 and the z-axis 404). The plot is drawn to the scale 406 (e.g., 9 mm long). The plot also illustrates the alignment of the two magnets 224 and 226. The armature magnet 226 is shown to be approximately three times as long as the ring magnet 224. The windings of the wire 218 are shown by the two blocks (representing the two portions 220 and the 222). FIG. 4 represents a natural state for the apparatus 122. When the armature magnet 226 is displaced, the armature magnet 226 returns to its position shown in the plot relative to the ring magnet 224 due to the strong magnetic pull from the ring magnet 224. In FIG. 4, there is no current driven through the wire 218, so the armature magnet 226 remains in the position aligned with the ring magnet 224. In some instances, the armature magnet 226 is referred to being positioned in a default position or default state, which is the position/state shown in FIG. 4.

Figure 5A:
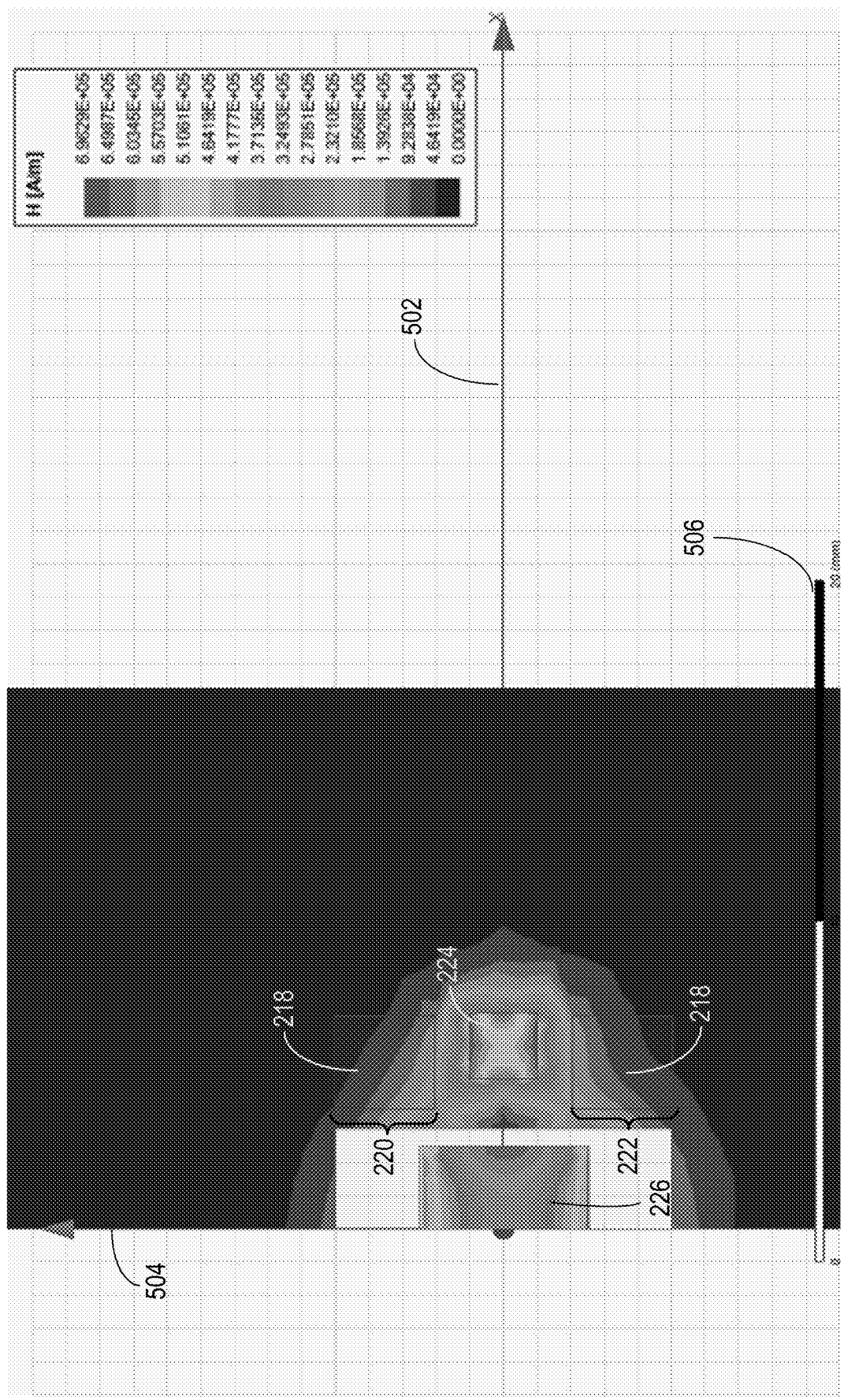
FIGS. 5A-5C illustrate a time plot of magnetic field of a representative haptic-feedback apparatus in accordance with some embodiments.
Figure 5B:
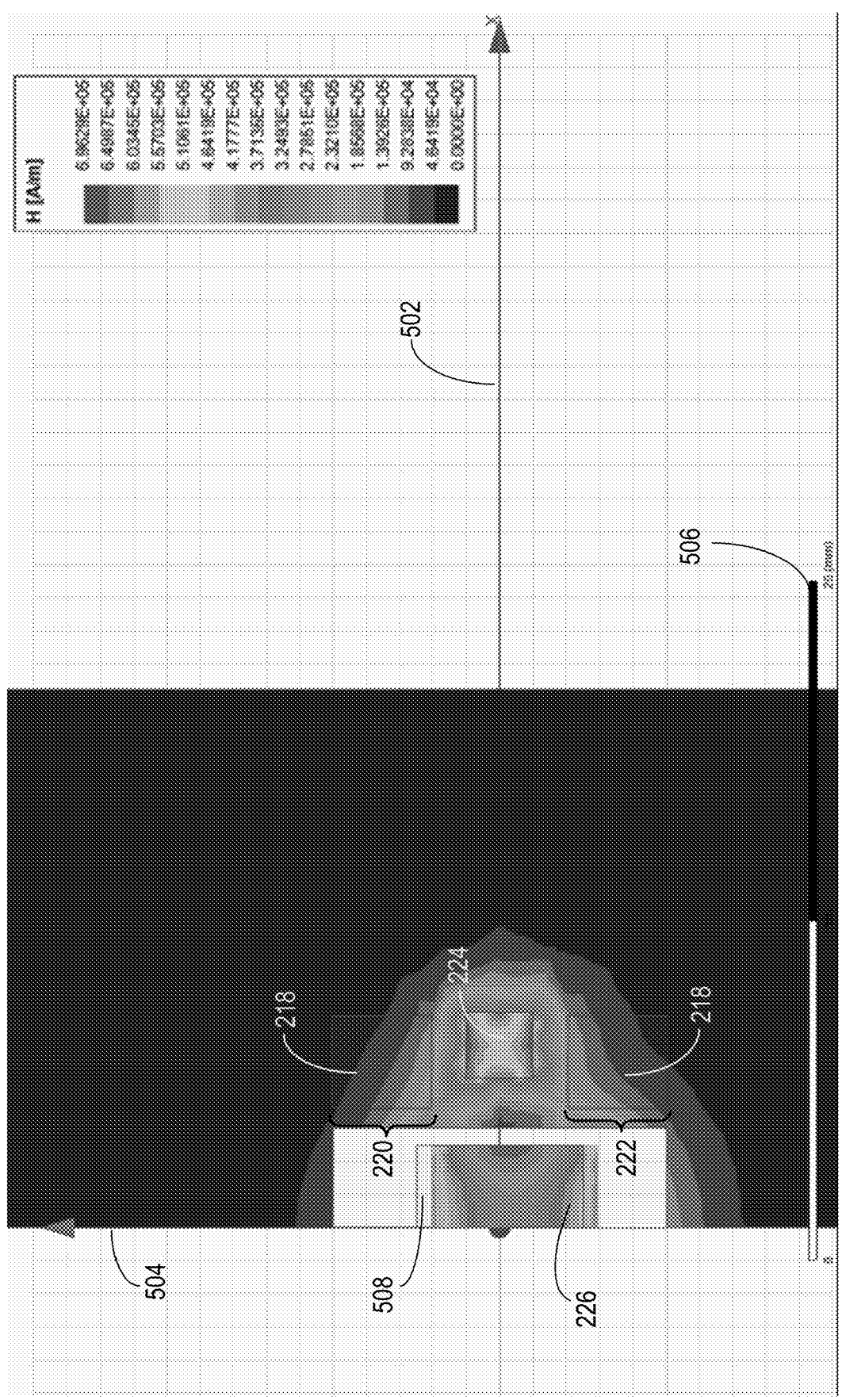
Figure 5C:
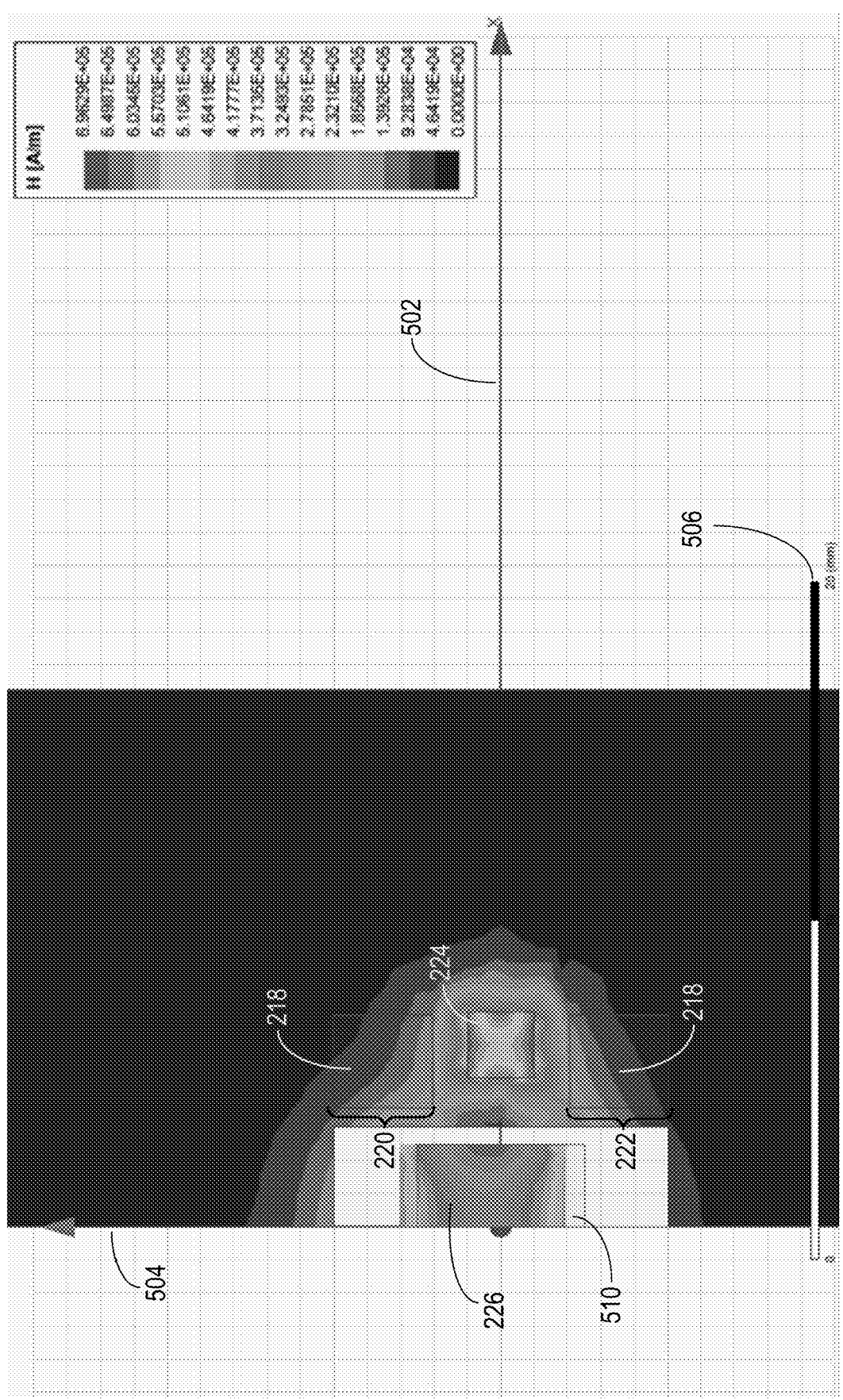

FIGS. 5A-5C illustrate time plots of the magnetic field of a representative haptic-feedback apparatus in accordance with some embodiments. The relative position of the components of the apparatus 122 are shown along two axes (the x-axis 502 and the z-axis 504). The plot is drawn to the scale 506 (e.g., 20 mm long). FIGS. 5A-5C correspond to the situation where current is driven through the wire 218. FIG. 5A is similar to FIG. 4, when an initial current is still insufficient to displace the armature magnet 226 (i.e., the armature magnet is in the default position). In FIG. 5B, the current through the wire 218 in the portion 220 pushes the armature magnet 226 (e.g., downwards along the z-axis 504) and the current through the wire 218 in the portion 222 pulls the armature magnet 226. Thus, a simultaneous push and pull magnetomotive force is created, causing the armature magnet 226 to displace from its initial position shown in FIG. 5A and move to its new position in FIG. 5B. The region 508 shows the extent of displacement of the armature magnet 226 relative to the initial position in FIG. 5A according to some embodiments.

Referring next to FIG. 5C, when the direction of the current is reversed, the current through the wire 218 in the portion 222 pushes the armature magnet 226 (e.g., upwards along the z-axis 504) and the current through the wire 218 in the portion 220 pulls the armature magnet 226. Thus, simultaneous push and pull magnetomotive forces are created, causing the armature magnet 226 to displace from its position shown in FIG. 5B and move to its new position in FIG. 5C. The region 510 shows the extent of displacement of the armature magnet 226 relative to the initial position in FIG. 5A according to some embodiments. Thus, by repeatedly changing the direction, the armature magnet 226 is caused to oscillate within the inner cavity 208 to create vibration. In some embodiments, the voltage (e.g., 5 volts) is delivered to the wire 218 so as to match a desired oscillating frequency of the armature magnet 226. The frequency at which the voltage is made to change its direction as well as the magnitude of the voltage determine (at least in part) the oscillating frequency of the armature magnet 226 and/or the displacement of the armature magnet 226 in the inner cavity 208. The oscillation of the armature magnet 226 causes the haptic device (and a user of the device) to experience vibration. It is noted that the regions 508 and 510 are one example set of regions, and a magnitude of those regions can be changed depending on a magnitude of the current driven through the wire 218.

The relative placement and/or orientation of the magnets 224 and 226 shown in FIGS. 5A-5C are used for illustration purposes. The principles in action (e.g., the electromagnetic force) can be applied in various other configurations. For example, the inner cavity 208 and/or the body 202 can be curve-shaped. Also, the armature magnet 226 may be sized appropriately (e.g., thinner compared to the size of the inner cavity), the armature magnet 226 may still slide through the inner cavity 208 (thereby causing vibrations) when there are sufficient push and pull forces induced by the current through the wire 218 in the portions 220 and 222. Thus, various form factor haptic devices may be built (e.g., to suitably position at corners of a device) using the apparatus 122. In some embodiments, the ferrofluid mentioned earlier provides lubrication for the motion of the armature magnet 226 within the inner cavity 208.

FIG. 6A illustrates an isometric view of an example hand-held controller 600 that includes one or more haptic devices 120 (e.g., a haptic device 635) in accordance with some embodiments. FIG. 6B illustrates another isometric view of the example hand-held controller 600 in accordance with some embodiments. The hand-held controller 600 generally comprises a grip 630 extending from a proximal end to a distal end, and a first user-input key 625 (e.g., a trigger) mounted partially on the grip 630. Alternatively, the first user-input key 625 is mounted entirely on the grip 630. The first user-input key 625 is mounted at a position on the grip 630 between the proximal and distal ends configured for easy access by one or more fingers of the user. The first user-input key 625 comprises a casing 615 which is depressible by the one or more fingers of the user and a switch 620 coupled to the casing 615. In some embodiments, the switch 620 includes a sensor configured to detect and distinguish between a range of pressures applied to the casing 615. In some embodiments, the haptic device 635 is mounted on the grip 630, as shown in FIGS. 6A and 6B.

In some embodiments, the hand-held controller 600 further comprises a user-input surface including a second user-input key 605A. The grip 630 is coupled at the proximal end to the user-input surface 610 and extends from the proximal end to the distal end at an angle from the user-input surface 610. In some embodiments, the user-input surface 610 comprises a plurality of user-input keys 605B and 605C in addition to the second user-input key 605A. In some embodiments, the user-input keys 605B and 605C also include haptic devices. In some embodiments, the respective user-input keys of the plurality of user-input keys 696A, 696B, and 605C are one or more of a thumbstick, a button, a trigger, a directional pad, or any other such part that a user manipulates in some way to carry out a specific action in an artificial-reality system (e.g., during gaming). In the example of FIG. 6A and FIG. 6B, the user input keys 605A, 605B, and 605C include a thumbstick 605A and buttons 605B and 605C. Thus, the user-input surface 610 is a surface on the controller where the user delivers an input by activating one or more of the user-input keys (e.g. by pressing, pushing or pulling the user-input keys 605A, 605B, or 605C) corresponding to an action that the user desires to carry out in the artificial-reality system. Each of the user-input keys 605A, 605B, and 605C is configured to communicate with the artificial-reality system so as to translate an operation of the user-input keys 605A, 605B, and 605C by the user into a corresponding action in the artificial-reality environment.

In some embodiments, the user-input keys 605B and/or 605C are an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the artificial-reality (e.g., gaming) experience, and the back and forward buttons may indicate a direction in which the user desires the image subject to move. The home button may be a button activated to return the gaming experience back to a main menu or to start the game or activity from the beginning.

In some embodiments, the grip 630 is coupled to the user-input surface 610. The grip 630 is the protruding structure of the hand-held controller 600 which the user grips in one hand to hold the hand-held controller 600. This configuration allows for the user to be able to grip the hand-held controller 600 between a palm and fingers (e.g., three or fewer fingers) while freeing up the thumb and, in some embodiments, another finger (e.g. the middle finger), for operating the user-input keys 605A, 605B, and 605C. In some embodiments, the middle finger is freed to operate the first user-input key 625 mounted at least in part on the grip 630. In some embodiments, the hand-held controller 600 further comprises a cage 640 coupled to the user-input surface 610. In some embodiments, the grip 630 is integrally formed with the user-input surface 610 and/or the cage 640, as one part (e.g., which may be formed from molding). In some embodiments, the cage 640, which may also be referred to as a tracking cage, includes an outer surface 645 on which a plurality of illumination devices 605D is positioned.

In some embodiments, the hand-held controller 600 includes at least one haptic-feedback apparatus 635 that creates haptic stimulations. The haptic-feedback apparatus 635 may be an example of the haptic-feedback apparatuses 122 discussed in FIGS. 2A-2E. In the illustrated embodiment, the haptic-feedback apparatus 635 is positioned in the grip 630 of the hand-held controller 600. However, depending on a shape of other hand-held controllers, the haptic-feedback apparatus 635 may be placed elsewhere. The haptic-feedback apparatus 635 is configured to created haptic ques (e.g., vibrations, clicks, etc.) according to instructions from a controller, such as the controller 682 in FIG. 6C.

Figure 6C:
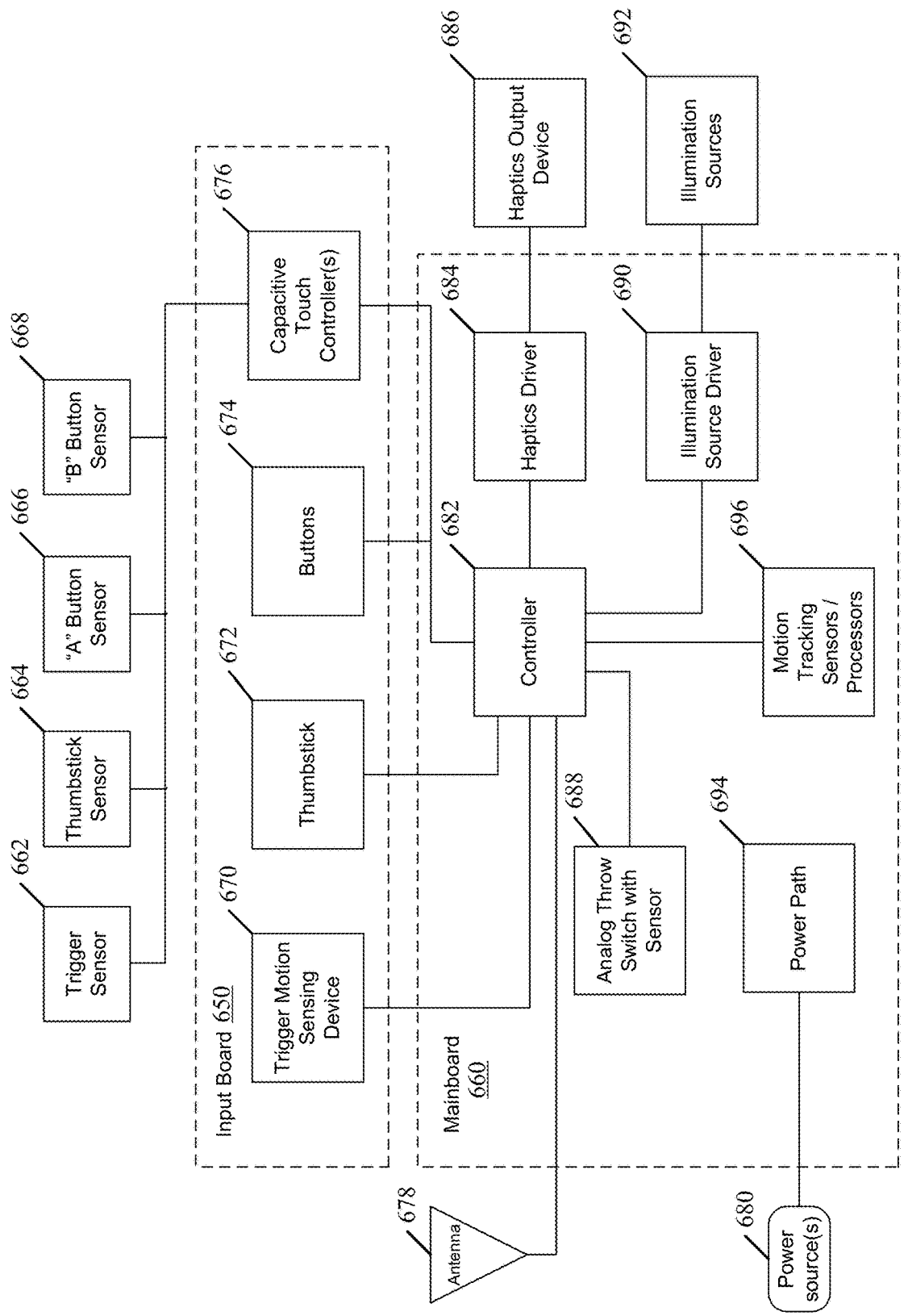
FIG. 6C is a block diagram illustrating an electrical configuration of the example hand-held controller in accordance with some embodiments.

FIG. 6C is a block diagram illustrating an electrical configuration of the example hand-held controller 600 in accordance with some embodiments. The hand-held controller includes an input board 650 and a mainboard 660 coupled to the input board 650. The input board 650 includes a trigger motion sensing device 670, a thumbstick 672, buttons 674, and a capacitive touch controller 676. In other examples, the input board 650 includes additional or alternative user-input keys. The trigger motion sensing device 670 detects user activation of a trigger (e.g., the first user input key 625 in FIG. 6A).

In some embodiments, the capacitive touch controller 676 is coupled to multiple sensors 662, 664, 666, and 668 such that the input board 650 receives sensed signals from the sensors resulting from a user's finger manipulating a portion (e.g., a user-input surface 610, and/or user input-keys 605A, 605B, 605C, or 605D) of the hand-held controller 600. For example, the sensors may include a trigger sensor 662, a thumbstick sensor 664, an "A" button sensor 666, and/or a "B" button sensor 668. For example, the trigger sensor 662 may sense when a user manipulates the trigger. Similarly, the thumbstick sensor 664 senses a signal resulting from the user manipulating the buttons 666 and 668. Other capacitive sensors may be included for other user-input keys (e.g., a directional pad).

In some embodiments, the mainboard 660 includes a controller 682, a haptics driver 684, an analog throw switch with sensor 688, power path 694, motion tracking sensors/processors 696, and an illumination source driver 690. The haptics driver 684 drives one or more haptics output devices 686 that provides haptic effects. The haptics output devices 686 are examples of the haptic-feedback apparatus 635 (FIGS. 6A and 6B), and, in turn, the haptic-feedback apparatuses 122 detailed above). An example of the haptics output device 686 includes a short vibration feedback device that, when activated, causes the hand-held controller to vibrate. Another example of the haptics output device 686 is a device that causes a user of the hand-held controller to experience clicks. Additionally, the haptics device may be configured for use with the capacitive touch sensors, thereby providing a vibration feedback to the user of the determined location of the user's finger corresponding to a desired action to be carried out in artificial reality. As one example, one or more of the input devices 605A, 605B, or 605C can be configured to include a haptic-feedback apparatus 122 so that, in addition to accepting input signals from the user and/or the system, the input devices also act as haptic output devices. In another example, a joystick may have a built-in haptic-feedback apparatus and provide vibrations and/or haptic clicks.

In some embodiments, the mainboard 660 is coupled to an antenna 678 to wirelessly receive and transmit signals. The hand-held controller 600 thus may be wireless. The mainboard 660 may also be coupled to a power source 680 to provide power supply to the controller 682. The power may be supplied to the mainboard 660 through a power path 694. In some embodiments, the illumination source driver 690 (e.g., LED driver) drives illumination sources 692 (e.g., LEDs on the outer surface of the cage 640) under the control of the controller 682, and thus turns the illumination sources 692 on or off. In some embodiments, the analog throw switch with sensor 688 is configured to detect and distinguish between a range of pressures applied to the first user-input key (e.g. when a user activates the trigger 625)

and this information is processed by the controller 682. The motion tracking sensors/processors 696 include a plurality of motion sensors (e.g. accelerometers and/or gyroscopes) which tracks motion of the hand-held controller based on motions made by the user. In some embodiments, the mainboard 660 (and its components) are part of the computer system 130 (FIG. 1).

Some embodiments are directed to two hand-held controllers—one to be held in each of a user's hands. In some embodiments, the two hand-held controllers may be identical, except for the position of at least one of the user-input keys, so as to be adapted specifically for either a left or right hand in which the hand-held controller is to be held. The first hand-held controller thus may be a right-handed controller and the second hand-held controller may be a left-handed controller. In other embodiments, the two hand-held controllers may be agnostic with respect to handedness (e.g., with both hand-held controllers having the same configuration of user-input keys, or with one hand-held controller having a configuration of user-input keys different than the other).

Figure 7A:
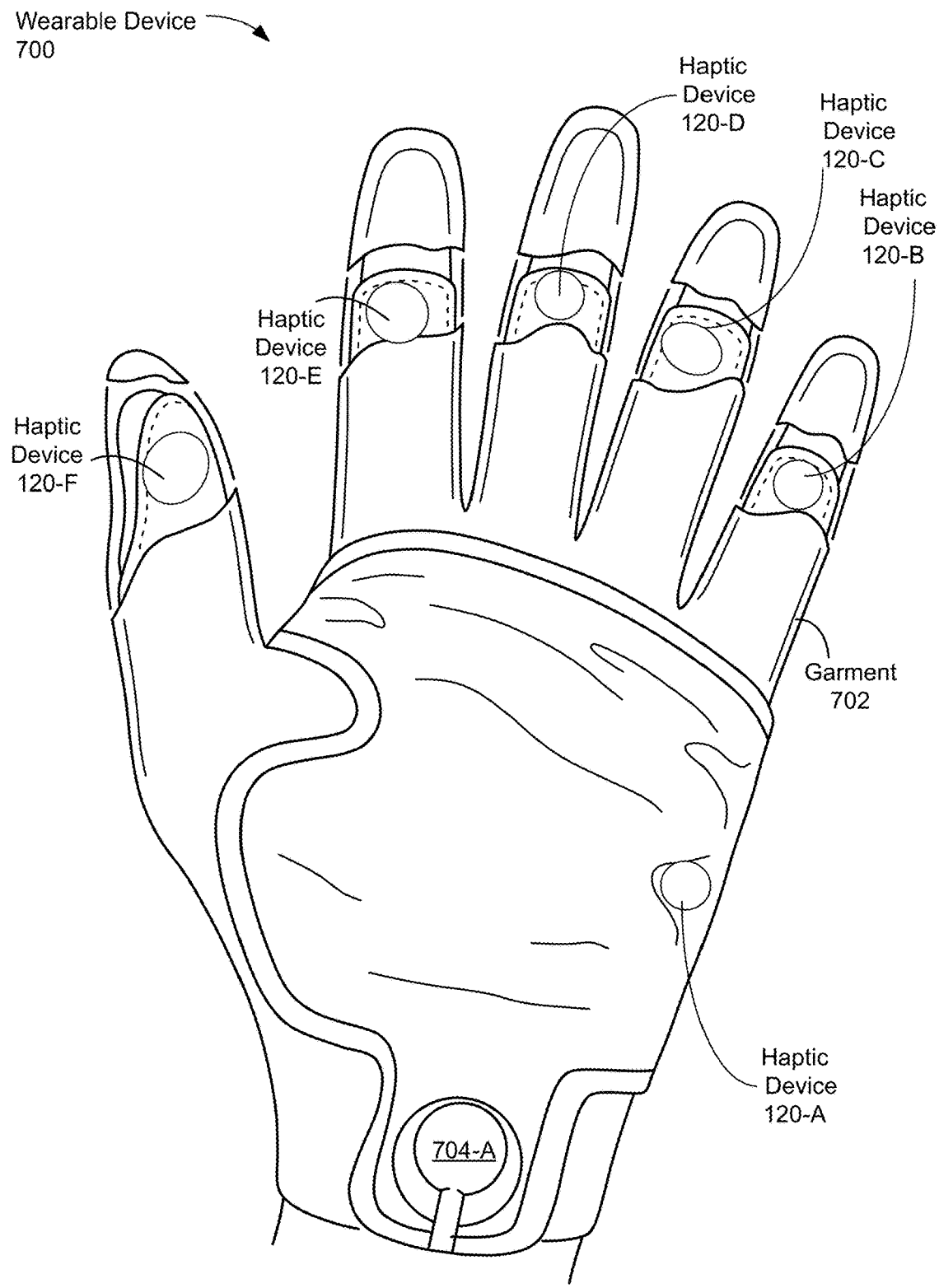
FIG. 7A shows an example wearable device that includes at least one haptic device in accordance with some embodiments.

FIG. 7A shows an example wearable device 700 (a glove) that includes at least one haptic device 120 in accordance with some embodiments. The device 700 is an example of the system 100. FIG. 7A shows a representative wearable device 700 that includes haptic devices 120-A through 120-F positioned on various regions of a user's hand in accordance with some embodiments. In particular, a first haptic device 120-A is positioned on a palm region of the user's hand, haptic devices 120-B through 120-E are positioned on palmar portions of the user's fingers, and a final haptic device 120-F is positioned on a palmar portion of the user's thumb. In such a configuration, each of these regions of the user's body can experience one or more haptic stimulations caused by a haptic device corresponding to that region.

In the illustrated embodiment, the haptic devices are connected to a controller (not shown) via a single connector or connection 704-A. Accordingly, when the haptic devices oscillate when activated, each of the regions corresponding to the haptic devices vibrate, and when the haptic devices are caused to click, the user would experience a click in each of the regions corresponding to the haptic devices.

Figure 7B:
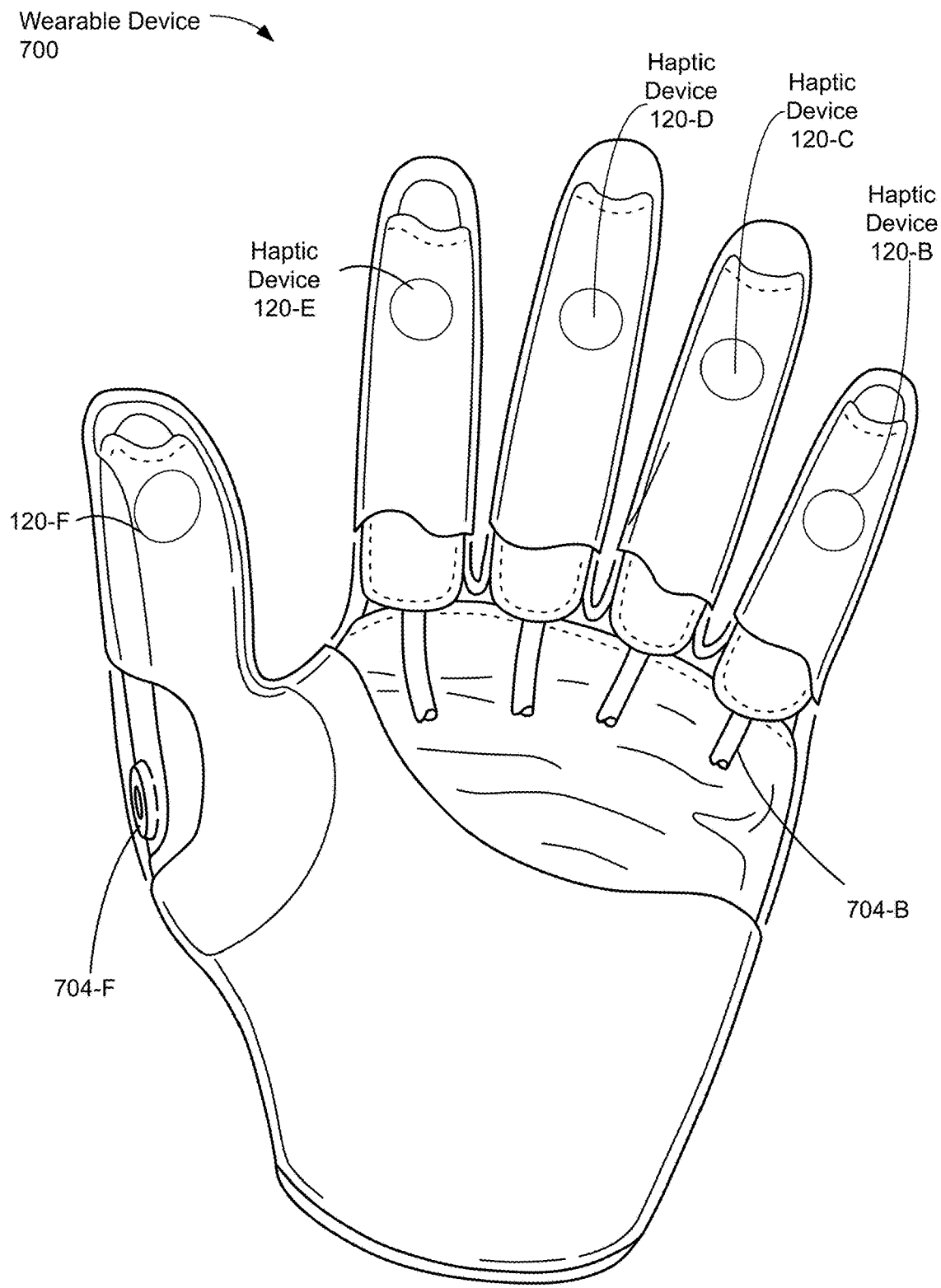
FIG. 7B shows another representative wearable device that includes haptic devices positioned on various regions of a user's hand in accordance with some embodiments.

FIG. 7B shows another representative wearable device 700 that includes haptic devices (e.g., the devices 120-B through 120-F) positioned on various regions of a user's hand in accordance with some embodiments. Unlike FIG. 7A, each of the haptic devices 120 in FIG. 7B has a distinct connector, including the connector 704-B for the haptic device 120-B and the connector 704-F for the haptic device 120-F. In such an arrangement, each of the haptic devices 120-B through 120-F may have its own connection and/or a controller. Thus, each haptic device can be individually activated or controlled (e.g., caused to oscillate or to click). Although not shown in FIGS. 7A and 7B, in some embodiments, the garment 702 covers the haptic devices so that the haptic devices 120 are not visible. However, for ease of illustration in FIGS. 7A and 7B, portions of the garment 702 have been removed to show the haptic devices 120 hidden beneath.

Although not shown, in some embodiments, one or more haptic devices are positioned on dorsal and palmar sides of the user's hand. For example, one or more of the user's fingers may include one or more haptic devices on the dorsal-side of the finger, and also one or more other haptic devices on the palmar-side of the finger. Similar configurations can be used on the palm and the back of the user's hand, and various other body parts of the user. In this way, the wearable device is able to increase haptics to the back of the user's hand, create unique haptic stimulations across the user's hand, and also increase control of the portion of the user's hand.

Further, while not shown, a haptic device 120 may be controlled by multiple controllers. In doing so, the wearable device is able to control the haptic device 120 with better latency results, and also activate or control haptic devices 120 in problem areas, such as corners of a pod.

Figure 8A:
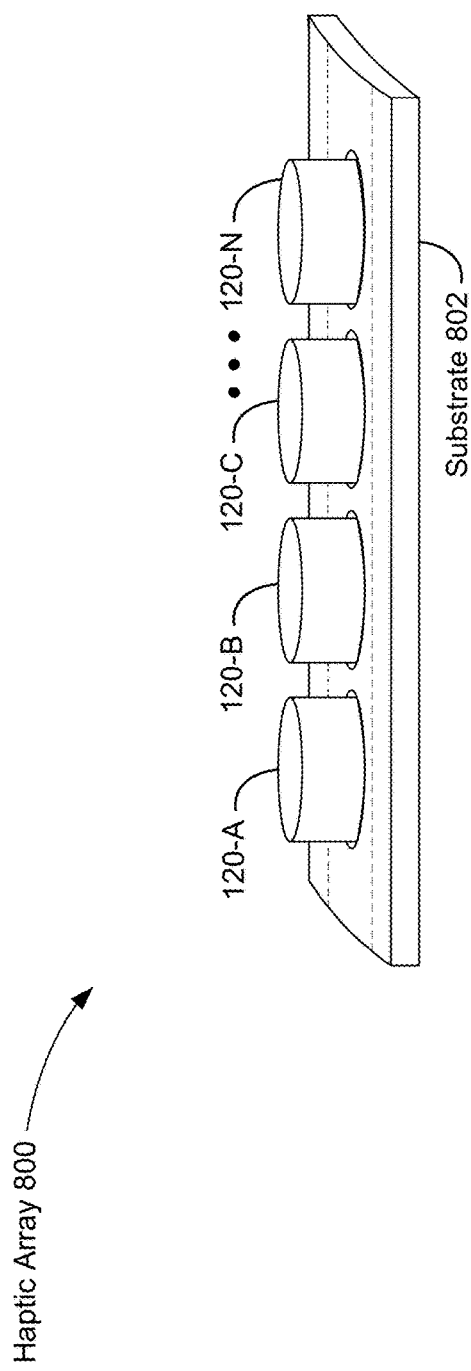
FIG. 8A illustrates a haptic device array in accordance with some embodiments.

FIG. 8A illustrates a haptic device array 800 in accordance with some embodiments. The haptic device array 800 includes a substrate 802 and a plurality of haptic devices 120-A, 120-B, 120-C, . . . 120-N integrated with the substrate 802. The haptic device array 800 can be used to create haptic stimulations across on area of the user's body. For example, if the haptic device array 800 is attached to the user's forearm, multiple portions of the user's forearm can be stimulated simultaneously or individually. In some embodiments, each haptic device 120 in the array 800 is controlled by a separate controller, whereas in other embodiments each device 120 in the array 800 is controlled by the same controller. The haptic device array 800 may be part of a wearable device, such as the wearable device 820 in FIG. 8B. In some embodiments, the haptic device array 800 can be controlled to create a stroking stimulation, where stimulations begin at one end of the array 800 and travel towards the other end of the array 800. Additionally, the speed between activation of each haptic device 120 in the array 800 can be varied to create different stroking stimulations.

Figure 8B:
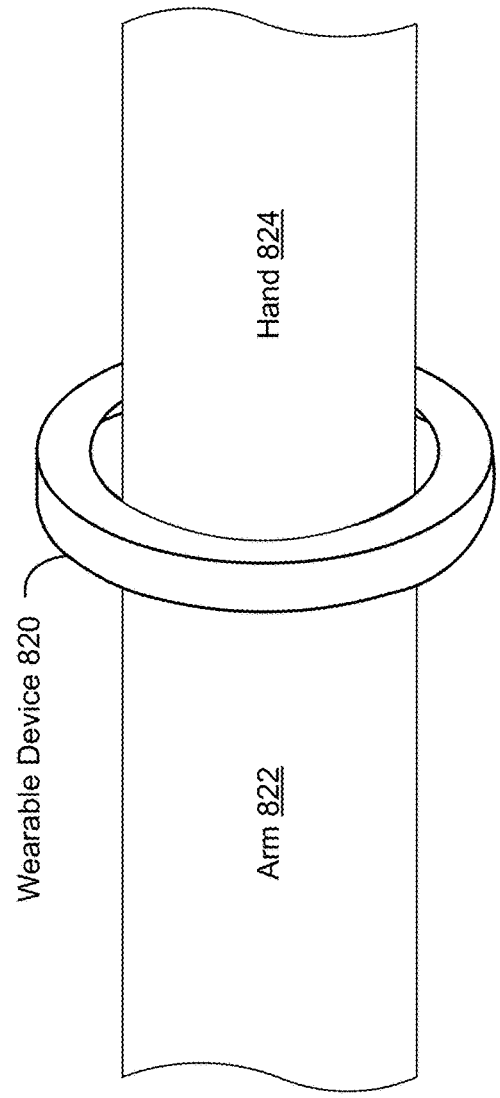
FIG. 8B illustrates a wearable device with a haptic device array attached to a user's wrist in accordance with some embodiments.

FIG. 8B illustrates a wearable device 820 attached to a user's wrist, between the user's arm 822 and the user's hand 824, in accordance with some embodiments. Although not shown, the haptic device array 800 is integrated with the wearable device 820. In some embodiments, the wearable device 820 is designed to not restrict movement of the user's hand 824. In some embodiments, the wearable device 820 is attached to a user's ankle, or various other body parts. The components of the haptic device 120 shown in FIG. 1 may be incorporated into the wearable device 820.

FIGS. 8C and 8D illustrate haptic devices 120 integrated with wearable devices 820 in accordance with some embodiments. As shown, the example wearable device 820 in FIGS. 8C and 8D includes a band 830 and a watch housing 832. In FIG. 8C, the wearable device 820 includes at least one haptic device 120 housed within the watch housing 832. In FIG. 8D, the wearable device 820 includes two or more haptic devices 120-A and 120-B integrated with the band 830. It is noted that more (or fewer) haptic devices 120 may be integrated with the band 830 than the number shown in FIG. 8D. In some embodiments, the wearable device 820 includes a combination of the embodiments shown in FIGS. 8C and 8D (e.g., haptic devices 120 housed by the watch housing 832 and integrated with the band 830).

Artificial-reality systems may be implemented in a variety of different form factors and configurations. Some artificial-reality systems are designed to work without near-eye displays (NEDs), an example of which is the artificial-reality system 900 described below in reference to FIG. 9. Other artificial-reality systems may include an NED, which provides visibility into the real world (e.g., the AR system 1000 described below in reference to FIG. 10) or that visually immerses a user in an artificial reality (e.g., the VR system 1100 described below in reference to FIG. 11). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user (e.g., a wearable device), devices worn by one or more other users, and/or any other suitable external system.

Figure 9:
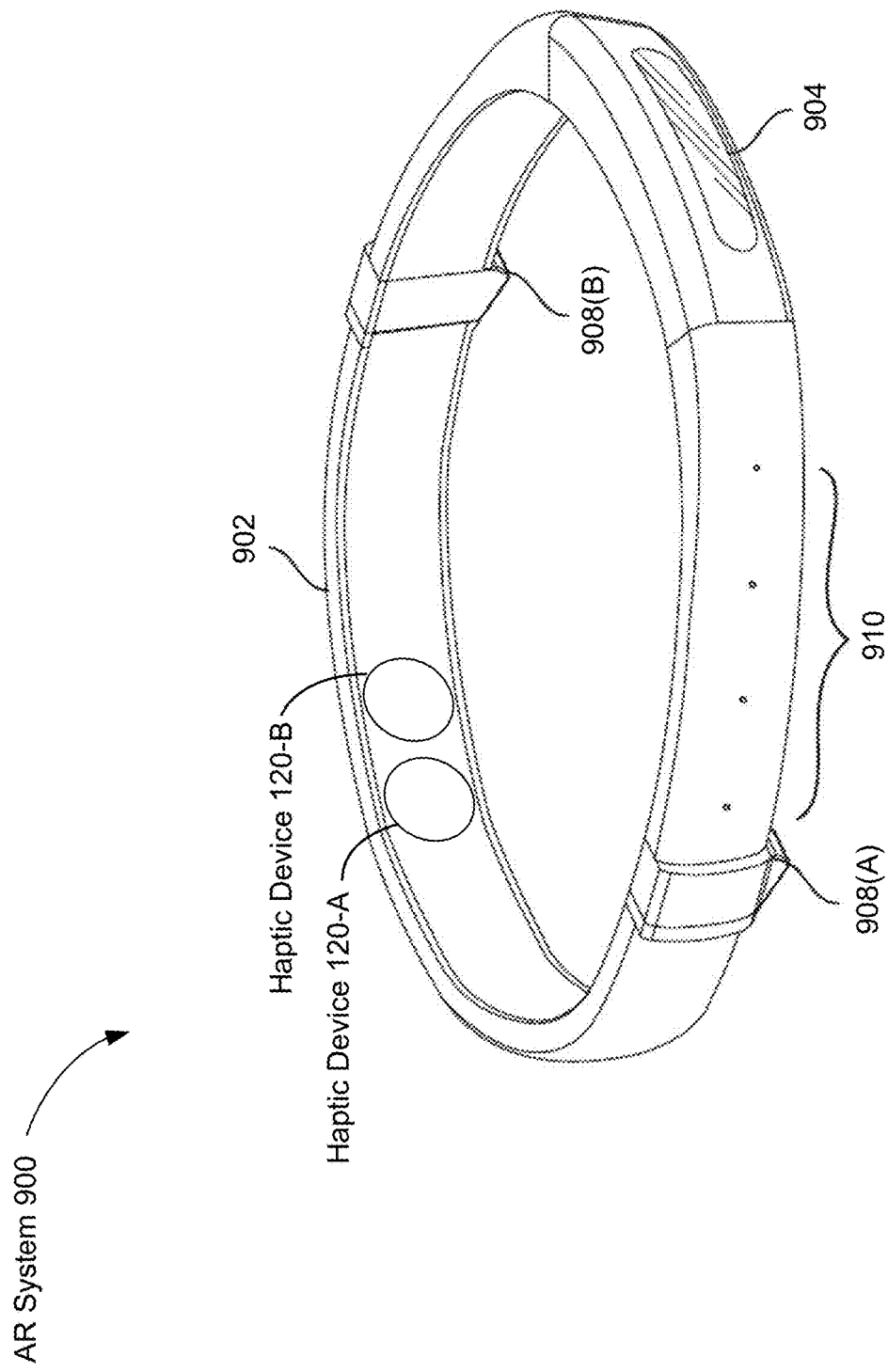
FIG. 9 illustrates an embodiment of an artificial-reality device.
Figure 10:
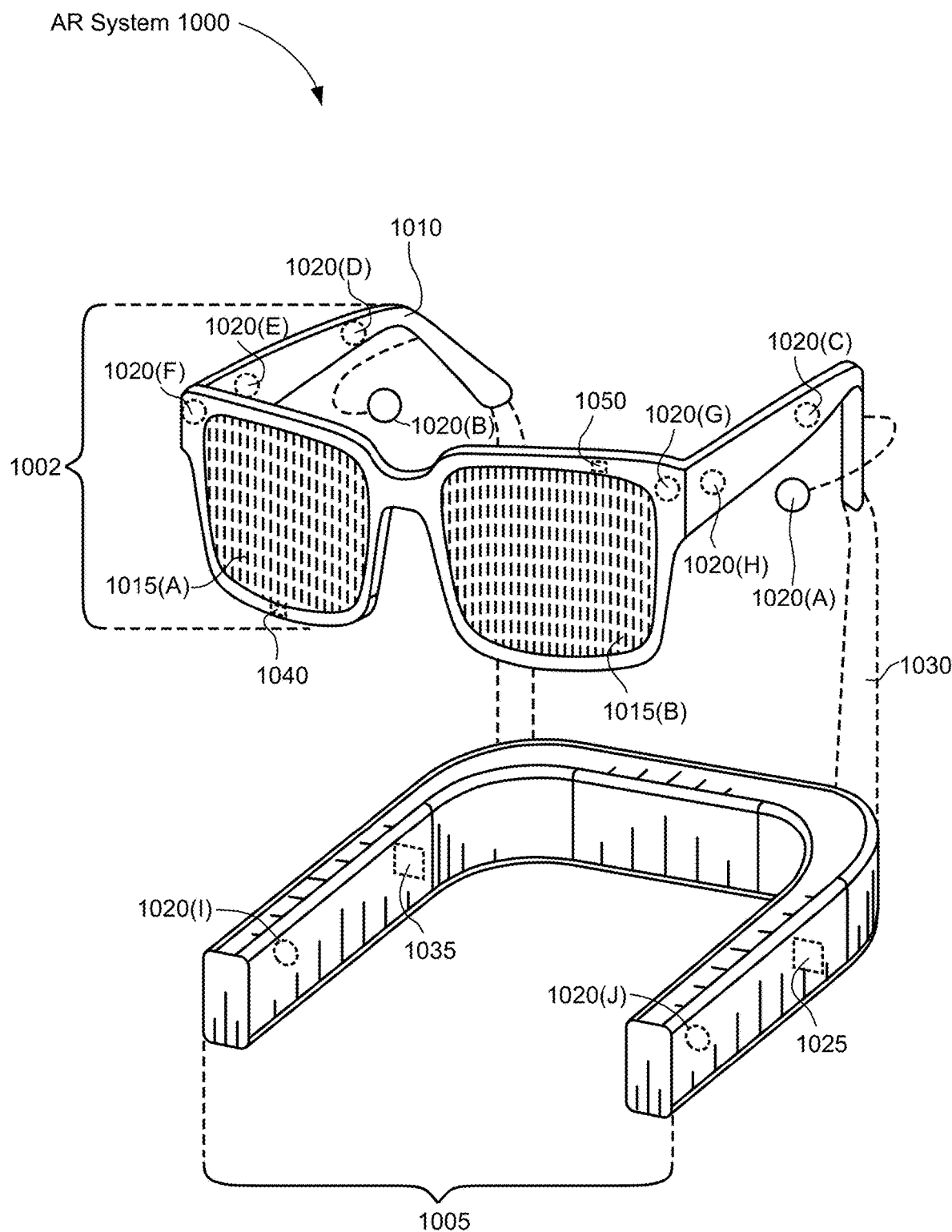
FIG. 10 illustrates an embodiment of an augmented-reality headset and a corresponding neckband.
Figure 11:
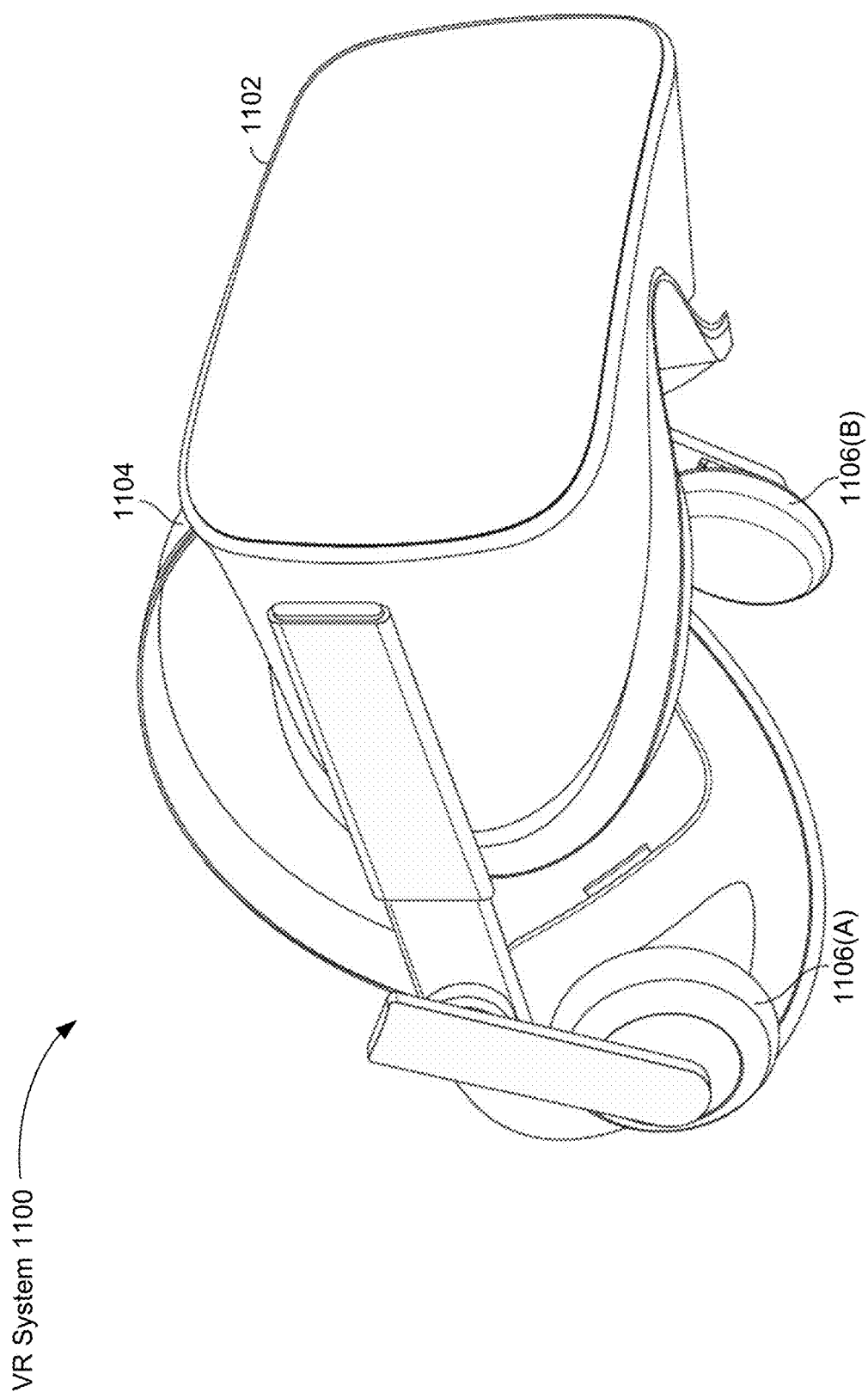
FIG. 11 illustrates an embodiment of a virtual-reality headset.

FIGS. 9-11 provide additional examples of the devices used in the system 100. The artificial-reality system 900 in FIG. 9 generally represents a wearable device dimensioned to fit about a body part (e.g., a head) of a user. The artificial-reality system 900 may include the functionality of the wearable device 820, and may include additional functions not described above. As shown, the artificial-reality system 900 includes a frame 902 (e.g., band) and a camera assembly 904, which is coupled to the frame 902 and configured to gather information about a local environment by observing the local environment. The artificial-reality system 900 may also include one or more transducers. In one example, the artificial-reality system 900 includes output transducers 908(A) and 908(B) and input transducers 910. Output transducers 908(A) and 908(B) may provide audio feedback, haptic feedback, and/or content to a user, and input audio transducers may capture audio (or other signals/waves) in a user's environment.

In some embodiments, the artificial-reality system 900 includes one or more instances of haptic devices 120 disclosed herein (e.g., the haptic devices 120-A and 120-B). In this way, the artificial-reality system 900 is able to create haptic stimulations, as discussed in detail above.

The artificial-reality system 900 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 900 may not include an NED, the artificial-reality system 900 may include other types of screens or visual feedback devices (e.g., a display screen integrated into a side of the frame 902).

The embodiments discussed in this disclosure may also be implemented in artificial-reality systems that include one or more NEDs. For example, as shown in FIG. 10, the augmented-reality (AR) system 1000 may include an eyewear device 1002 with a frame 1010 configured to hold a right display device 1015(A) and a left display device 1015(B) in front of a user's eyes. The display devices 1015(A) and 1015(B) may act together or independently to present an image or series of images to a user. While the AR system 1000 includes two displays, embodiments of this disclosure may be implemented in AR systems with a single NED or more than two NEDs.

In some embodiments, the AR system 1000 may include one or more sensors, such as the sensors 1040 and 1050. The sensors 1040 and 1050 may generate measurement signals in response to motion of the AR system 1000 and may be located on substantially any portion of frame 1010. The sensors 1040 and 1050 may include a position sensor, an inertial measurement unit (IMU), a depth camera assembly, or any combination thereof. The AR system 1000 may or may not include sensors or may include more than one sensor. In embodiments in which the sensor 1040 or the sensor 1050 is an IMU, the IMU may generate calibration data based on measurement signals from the sensor. Examples of the sensors 1040 and 1050 include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 1000 may also include a microphone array with a plurality of acoustic sensors 1020(A)-1020(J), referred to collectively as the acoustic sensors 1020. The acoustic sensors 1020 may be transducers that detect air pressure variations induced by sound waves. Each acoustic sensor 1020 may be configured to detect sound and convert the detected sound into an electronic format (e.g., an analog or digital format). The microphone array in FIG. 10 may include, for example, ten acoustic sensors: 1020(A) and 1020(B), which may be designed to be placed inside a corresponding ear of the user, acoustic sensors 1020(C), 1020(D), 1020(E), 1020(F), 1020(G), and 1020(H), which may be positioned at various locations on the frame 1010, and/or acoustic sensors 1020(I) and 1020(J), which may be positioned on a corresponding neckband 1005. In some embodiments, the neckband 1005 is an example of the computer system 130.

The configuration of acoustic sensors 1020 of the microphone array may vary. While the AR system 1000 is shown in FIG. 10 as having ten acoustic sensors 1020, the number of acoustic sensors 1020 may be greater or less than ten. In some embodiments, using more acoustic sensors 1020 may increase the amount of audio information collected and/or the sensitivity and accuracy of the audio information. In contrast, using a lower number of acoustic sensors 1020 may decrease the computing power required by a controller 1025 to process the collected audio information. In addition, the position of each acoustic sensor 1020 of the microphone array may vary. For example, the position of an acoustic sensor 1020 may include a defined position on the user, a defined coordinate on the frame 1010, an orientation associated with each acoustic sensor, or some combination thereof.

The acoustic sensors 1020(A) and 1020(B) may be positioned on different parts of the user's ear, such as behind the pinna or within the auricle or fossa. Or, there may be additional acoustic sensors on or surrounding the ear in addition to acoustic sensors 1020 inside the ear canal. Having an acoustic sensor positioned next to an ear canal of a user may enable the microphone array to collect information on how sounds arrive at the ear canal. By positioning at least two of the acoustic sensors 1020 on either side of a user's head (e.g., as binaural microphones), the AR device 1000 may simulate binaural hearing and capture a 3D stereo sound field about a user's head. In some embodiments, the acoustic sensors 1020(A) and 1020(B) may be connected to the AR system 1000 via a wired connection, and in other embodiments, the acoustic sensors 1020(A) and 1020(B) may be connected to the AR system 1000 via a wireless connection (e.g., a Bluetooth connection). In still other embodiments, acoustic sensors 1020(A) and 1020(B) may not be used at all in conjunction with the AR system 1000.

The acoustic sensors 1020 on the frame 1010 may be positioned along the length of the temples, across the bridge, above or below the display devices 1015(A) and 1015(B), or some combination thereof. The acoustic sensors 1020 may be oriented such that the microphone array is able to detect sounds in a wide range of directions surrounding the user wearing AR system 1000. In some embodiments, an optimization process may be performed during manufacturing of AR system 1000 to determine relative positioning of each acoustic sensor 1020 in the microphone array.

The AR system 1000 may further include or be connected to an external device (e.g., a paired device), such as neckband 1005. As shown, the neckband 1005 may be coupled to the eyewear device 1002 via one or more connectors 1030. The connectors 1030 may be wired or wireless connectors and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and the neckband 1005 in example locations on the eyewear device 1002 and the neckband 1005, the components may be located elsewhere and/or distributed differently on the eyewear device 1002 and/or the neckband 1005. In some embodiments, the components of the eyewear device 1002 and the neckband 1005 may be located on one or more additional peripheral devices paired with the eyewear device 1002, the neckband 1005, or some combination thereof. Furthermore, the neckband 1005 generally represents any type or form of paired device. Thus, the following discussion of neckband 1005 may also apply to various other paired devices, such as smart watches, smart phones, wrist bands, other wearable devices, hand-held controllers, tablet computers, or laptop computers.

Pairing external devices, such as a neckband 1005, with AR eyewear devices may enable the eyewear devices to achieve the form factor of a pair of glasses while still providing sufficient battery and computational power for expanded capabilities. Some or all of the battery power, computational resources, and/or additional features of the AR system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 because users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computational capacity than might otherwise have been possible on a stand-alone eyewear device. Because weight carried in the neckband 1005 may be less invasive to a user than weight carried in the eyewear device 1002, a user may tolerate wearing a lighter eyewear device and carrying or wearing the paired device for greater lengths of time than the user would tolerate wearing a heavy standalone eyewear device, thereby enabling an artificial-reality environment to be incorporated more fully into a user's day-to-day activities.

The neckband 1005 may be communicatively coupled with the eyewear device 1002 and/or to other devices. The other devices may provide certain functions (e.g., tracking, localizing, depth mapping, processing, storage, etc.) to the AR system 1000. In the embodiment of FIG. 10, the neckband 1005 may include two acoustic sensors 1020(I) and 1020(J), which are part of the microphone array (or potentially form their own microphone subarray). The neckband 1005 may also include a controller 1025 and a power source 1035.

The acoustic sensors 1020(I) and 1020(J) of the neckband 1005 may be configured to detect sound and convert the detected sound into an electronic format (analog or digital). In the embodiment of FIG. 10, the acoustic sensors 1020(I) and 1020(J) may be positioned on the neckband 1005, thereby increasing the distance between neckband acoustic sensors 1020(I) and 1020(J) and the other acoustic sensors 1020 positioned on the eyewear device 1002. In some cases, increasing the distance between the acoustic sensors 1020 of the microphone array may improve the accuracy of beamforming performed via the microphone array. For example, if a sound is detected by the acoustic sensors 1020(C) and 1020(D) and the distance between acoustic sensors 1020(C) and 1020(D) is greater than, for example, the distance between the acoustic sensors 1020(D) and 1020(E), the determined source location of the detected sound may be more accurate than if the sound had been detected by the acoustic sensors 1020(D) and 1020(E).

The controller 1025 of the neckband 1005 may process information generated by the sensors on the neckband 1005 and/or the AR system 1000. For example, the controller 1025 may process information from the microphone array, which describes sounds detected by the microphone array. For each detected sound, the controller 1025 may perform a direction of arrival (DOA) estimation to estimate a direction from which the detected sound arrived at the microphone array. As the microphone array detects sounds, the controller 1025 may populate an audio data set with the information. In embodiments in which the AR system 1000 includes an IMU, the controller 1025 may compute all inertial and spatial calculations from the IMU located on the eyewear device 1002. The connector 1030 may convey information between the AR system 1000 and the neckband 1005 and between the AR system 1000 and the controller 1025. The information may be in the form of optical data, electrical data, wireless data, or any other transmittable data form. Moving the processing of information generated by the AR system 1000 to the neckband 1005 may reduce weight and heat in the eyewear device 1002, making it more comfortable to a user.

The power source 1035 in the neckband 1005 may provide power to the eyewear device 1002 and/or to the neckband 1005. The power source 1035 may include, without limitation, lithium-ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by the power source 1035.

As noted, some artificial-reality systems may, instead of blending an artificial reality with actual reality, substantially replace one or more of a user's sensory perceptions of the real world with a virtual experience. One example of this type of system is a head-worn display system, such as the VR system 1100 in FIG. 11, which mostly or completely covers a user's field of view. The VR system 1100 may include a front rigid body 1102 and a band 1104 shaped to fit around a user's head. The VR system 1100 may also include output audio transducers 1106(A) and 1106(B). Furthermore, while not shown in FIG. 11, the front rigid body 1102 may include one or more electronic elements, including one or more electronic displays, one or more IMUs, one or more tracking emitters or detectors, and/or any other suitable device or system for creating an artificial-reality experience. Although not shown, the VR system 1100 may include the computer system 130.

Artificial-reality systems may include a variety of types of visual feedback mechanisms. For example, display devices in the AR system 1000 and/or the VR system 1100 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1000 and/or the VR system 1100 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the artificial-reality system 900, the AR system 1000, and/or the VR system 1100 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 9 and 11, the output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 910 may include condenser microphones, dynamic microphones, ribbon microphones, and/or any other type or form of input transducer. In some embodiments, a single transducer may be used for both audio input and audio output.

The artificial-reality systems shown in FIGS. 9-11 may include tactile (i.e., haptic) feedback systems, which may be incorporated into headwear, gloves, body suits, handheld controllers, environmental devices (e.g., chairs or floor mats), and/or any other type of device or system, such as the wearable devices 820 discussed herein. Additionally, in some embodiments, the haptic feedback systems may be incorporated with the artificial-reality systems (e.g., the artificial-reality system 900 may include the haptic device 120 shown in FIG. 1). Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independently of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial-reality experience in one or more of these contexts and environments and/or in other contexts and environments.

In some embodiments, a method of generating haptic stimulations is provided. The steps of the method may be performed by the haptic device 120 (e.g., based on instructions stored in a computer memory or computer readable storage medium, or the memory of the haptic device 120). The method includes receiving an instruction from a computer system 130 to transition the haptic-feedback apparatus 122 (e.g., an armature magnet in the apparatus) from a first state (e.g., a stationary state or a first oscillating frequency) to a second state (e.g., an active state or a distinct oscillating frequency). In some embodiments, the instruction from the computer system is generated based on media content displayed to the user via the head-mounted display 110 and/or information collected by the haptic device (e.g., via sensors included with the haptic device) and/or the head-mounted display (e.g., via sensors included with the head-mounted display).

The method also includes, in response to receiving the instruction, transitioning the haptic-feedback apparatus 122 to the second state based on the instruction. In this state, the first haptic assembly creates a first haptic stimulation or a second haptic stimulation, felt by a wearer of the haptic device. In some embodiments, the haptic stimulation corresponds to media content displayed to the user via the head-mounted display 110.

In some embodiments, a controller is configured to control operation of the haptic-feedback apparatus 122. For example, the controller sends one or more signals, generated based on the instruction from the computer system, that activate the apparatus 122 (e.g., activation of the apparatus 122 causes the apparatus to transition from the first state to the second state, and vice versa).

In some embodiments, the instruction instructs the haptic device to create a first haptic stimulation (a vibration), a second haptic stimulation (a click), or both. In this way, the haptic device is able to create a unique haptic cue by combining the first and second haptic stimulations, or create unique haptic cues by separating the first and second haptic stimulations. In doing so, the haptic device can convey information to the user in three different forms, as discussed above.

Embodiments of this disclosure may include or be implemented in conjunction with various types of artificial-reality systems. Artificial reality may constitute a form of reality that has been altered by virtual objects for presentation to a user. Such artificial reality may include and/or represent VR, AR, MR, hybrid reality, or some combination and/or variation of one or more of these systems. Artificial reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used to, for example, create content in an artificial reality and/or are otherwise used in (e.g., to perform activities in) an artificial reality.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An apparatus for creating haptic stimulations, comprising:
   a body including opposing first and second ends, wherein the body defines an inner cavity that extends from the first end to the second end of the body, the inner cavity defining a first opening at the first end and a second opening towards the second end, whereby the second opening, smaller in diameter than the first opening, acts as a stop;
   a pair of connectors including a first connector positioned adjacent to the first end of the body and a second connector positioned adjacent to the second end of the body;
   a wire that electrically connects the first connector to the second connector, wherein the wire is wound around a first portion of the body in a first direction and the wire is wound around a second portion of the body in a second direction opposite to the first direction;
   a ring magnet secured to an outer surface of the body, wherein the ring magnet separates the first portion of the body from the second portion of the body; and
   an armature magnet slidably positioned within the inner cavity of the body;
   wherein:
      when a voltage below a threshold is applied to the wire, simultaneous push and pull forces are created by current passing through the wire, causing the armature magnet to oscillate within the inner cavity to create a vibration; and
      when a voltage above the threshold is applied to the wire, the armature magnet is configured to impact the stop of the inner cavity, causing a user of the apparatus to experience a "click" stimulation.

2. The apparatus of claim 1, wherein the inner cavity includes ferrofluid to dampen noise associated with oscillation of the armature magnet.

3. The apparatus of claim 1, further comprising a Hall-effect sensor configured to detect a position of the armature magnet.

4. The apparatus of claim 1, wherein the apparatus is coupled to a control system that modulates the current according to (i) a delay in response and (ii) a desired oscillating frequency of the armature magnet.

5. The apparatus of claim 1, wherein the current is delivered to the wire as an individual pulse so that a magnitude of the current exceeds the threshold.

6. The apparatus of claim 1, wherein the current is delivered to the wire so as to match a desired oscillating frequency of the armature magnet.

7. The apparatus of claim 1, wherein the body is a bobbin.

8. The apparatus of claim 1, wherein the first direction is clockwise direction and the second direction is counter-clockwise direction.

9. The apparatus of claim 1, wherein the armature magnet is configured to realign with a position of the ring magnet.

10. The apparatus of claim 9, wherein the armature magnet is configured to return to a position that is approximately near a center of the inner cavity.

11. The apparatus of claim 1, wherein the armature magnet is 5 mm in diameter and 5 mm in length.

12. The apparatus of claim 1, wherein the armature magnet is three times as long as the ring magnet.

13. The apparatus of claim 1, wherein the ring magnet comprises two magnetically coupled ring segment magnets.

14. The apparatus of claim 13, wherein the two magnetically coupled ring segment magnets are positioned in respective grooves on the body and kept in their respective positions due to their mutual magnetic pull.

15. The apparatus of claim 1, wherein the pair of connectors are insulation displacement connectors.

16. The apparatus of claim 1, wherein the wire is a continuous strand of magnet wire.

17. The apparatus of claim 1, wherein:
    the wire is first passed through a slot in a pocket corresponding to the first connector before being wound around the first portion of the body in the first direction,
    the wire is passed through a groove and then wound in the second direction around the second portion, and
    the wire is routed around into a slot in a pocket corresponding to the second connector.

18. The apparatus of claim 1, wherein a size and length of the wire are configured so as to match a desired oscillating frequency of the armature magnet.

19. The apparatus of claim 1, wherein the armature magnet is displaced from its initial position by half a millimeter during oscillations.

20. A method of creating haptic stimulations, comprising:
    at an apparatus having:
       a body including opposing first and second ends, wherein the body defines an inner cavity that extends from the first end to the second end of the body, the inner cavity defining a first opening at the first end and a second opening towards the second end, whereby the second opening, smaller in diameter than the first opening, acts as a stop;
       a pair of connectors including a first connector positioned adjacent to the first end of the body and a second connector positioned adjacent to the second end of the body;
       a wire that electrically connects the first connector to the second connector, wherein the wire is wound around a first portion of the body in a first direction and the wire is wound around a second portion of the body in a second direction opposite to the first direction;

a ring magnet secured to an outer surface of the body, wherein the ring magnet separates the first portion of the body from the second portion of the body; and an armature magnet slidably positioned within the inner cavity of the body;

in response to applying a voltage, below a predetermined threshold, to the wire, simultaneously creating push and pull forces according to current passing through the wire, causing the armature magnet to oscillate within the inner cavity to create a vibration; and in response to applying a voltage, above the predetermined threshold, to the wire, causing the armature magnet to impact the stop of the inner cavity, thereby providing a user of the apparatus to experience a "click" stimulation.

* * * * *